(12) United States Patent
Wang et al.

(10) Patent No.: US 12,072,447 B2
(45) Date of Patent: Aug. 27, 2024

(54) COMPACT LIDAR DESIGN WITH HIGH RESOLUTION AND ULTRA-WIDE FIELD OF VIEW

(71) Applicant: Innovusion, Inc., Sunnyvale, CA (US)

(72) Inventors: Haosen Wang, Sunnyvale, CA (US); Ning-Yi Wang, Fremont, CA (US); Peng Wan, San Jose, CA (US); Yufeng Li, Milpitas, CA (US); Yimin Li, Cupertino, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

(21) Appl. No.: 18/141,961

(22) Filed: May 1, 2023

(65) Prior Publication Data
US 2023/0266443 A1    Aug. 24, 2023

Related U.S. Application Data

(63) Continuation of application No. 17/723,270, filed on Apr. 18, 2022, now Pat. No. 11,662,439.
(Continued)

(51) Int. Cl.
*G01S 7/481*     (2006.01)
*G01S 7/4865*    (2020.01)
*G01S 17/931*    (2020.01)

(52) U.S. Cl.
CPC .......... *G01S 7/4817* (2013.01); *G01S 7/4813* (2013.01); *G01S 7/4865* (2013.01); *G01S 17/931* (2020.01)

(58) Field of Classification Search
CPC .............................. G01S 7/4813; G01S 7/4817
See application file for complete search history.

(56) References Cited

U.S. PATENT DOCUMENTS 3,897,150 A    7/1975  Bridges et al.
4,043,632 A    8/1977  Jeffery et al.
(Continued)

FOREIGN PATENT DOCUMENTS

CN    1677050 A      10/2005
CN    204758260 U    11/2015
(Continued)

OTHER PUBLICATIONS

International Search Report and Written Opinion issued in PCT/US2022/025248 dated Sep. 6, 2022, 19 pages.
(Continued)

*Primary Examiner* — Thanh Luu
(74) *Attorney, Agent, or Firm* — MASCHOFF BRENNAN; Ran Pang; Liang Huang

(57) ABSTRACT

A compact LiDAR device is provided. The compact LiDAR device includes a first mirror disposed to receive one or more light beams and a polygon mirror optically coupled to the first mirror. The polygon mirror comprises a plurality of reflective facets. For at least two of the plurality of reflective facets, each reflective facet is arranged such that: a first edge, a second edge, and a third edge of the reflective facet correspond to a first line, a second line, and a third line; the first line and the second line intersect to form a first internal angle of a plane comprising the reflective facet; and the first line and the third line intersect to form a second internal angle of the plane comprising the reflective facet. The first internal angle is an acute angle; and the second internal angle is an obtuse angle.

25 Claims, 13 Drawing Sheets

Related U.S. Application Data

(60) Provisional application No. 63/178,467, filed on Apr. 22, 2021.

(56) References Cited

U.S. PATENT DOCUMENTS

| | | |
|---|---|---|
| 4,205,100 A | 5/1980 | Fisli |
| 4,412,720 A | 11/1983 | Costa |
| 4,464,048 A | 8/1984 | Farlow |
| 4,967,076 A | 10/1990 | Schuhmacher et al. |
| 5,006,721 A | 4/1991 | Cameron et al. |
| 5,157,451 A | 10/1992 | Taboada et al. |
| 5,303,084 A | 4/1994 | Pilibsen et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | DeAngelis et al. |
| 5,687,017 A | 11/1997 | Katoh et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,788,445 B2 | 9/2004 | Goldberg et al. |
| 6,788,861 B1 * | 9/2004 | Utsui ............ A61B 5/6852 385/119 |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,382,442 B2 | 6/2008 | Adachi et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,984,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,132 B2 | 9/2018 | Ishikawa et al. |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,422,863 B2 | 9/2019 | Choi et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,782,392 B2 | 9/2020 | Ishikawa et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2004/135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2005/0219506 A1 | 10/2005 | Okuda et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |

(56) References Cited

U.S. PATENT DOCUMENTS

| | | |
|---|---|---|
| 2010/0271614 A1 | 10/2010 | Albuquerque et al. |
| 2011/0181864 A1 | 7/2011 | Schmitt et al. |
| 2012/0038803 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0124238 A1 | 5/2015 | Sakal et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | McCloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284246 A1 | 10/2018 | LaChapelle |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0101627 A1 | 4/2019 | Hansson et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1* | 7/2019 | Li .................. G01S 17/931 |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1* | 8/2019 | Zhang .................. G01S 7/484 |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0166647 A1 | 5/2020 | Crouch et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9* | 3/2021 | Zhang .................. G01S 7/4817 |
| 2022/0113406 A1* | 4/2022 | Cho .................. G01S 17/42 |
| 2022/0128672 A1 | 4/2022 | Kim et al. |

FOREIGN PATENT DOCUMENTS

| | | | |
|---|---|---|---|
| CN | 204885804 U | 12/2015 | |
| CN | 108132472 A | 6/2018 | |
| CN | 207457508 U | 6/2018 | |
| CN | 207557465 U | 6/2018 | |
| CN | 208314210 U | 1/2019 | |
| CN | 208421228 U | 1/2019 | |
| CN | 208705506 U | 4/2019 | |
| CN | 106597471 B | 5/2019 | |
| CN | 209280923 U | 8/2019 | |
| CN | 108445468 B | 11/2019 | |
| CN | 110031823 B | 3/2020 | |
| CN | 108089201 B | 4/2020 | |
| CN | 109116331 B | 4/2020 | |
| CN | 109917408 B | 4/2020 | |
| CN | 109116366 B | 5/2020 | |
| CN | 109116367 B | 5/2020 | |
| CN | 110031822 B | 5/2020 | |
| CN | 211655309 U | 10/2020 | |
| CN | 109188397 B | 11/2020 | |
| CN | 109814086 B | 11/2020 | |
| CN | 109917348 B | 11/2020 | |
| CN | 110492856 B | 11/2020 | |
| CN | 110736975 B | 11/2020 | |
| CN | 109725320 B | 12/2020 | |
| CN | 110780284 B | 12/2020 | |
| CN | 110780283 B | 1/2021 | |
| CN | 112204419 A * | 1/2021 | ......... A41D 13/1107 |
| CN | 110784220 B | 2/2021 | |
| CN | 212623082 U | 2/2021 | |
| CN | 110492349 B | 3/2021 | |
| CN | 109950784 B | 5/2021 | |
| CN | 213182011 U | 5/2021 | |
| CN | 213750313 U | 7/2021 | |
| CN | 214151038 U | 9/2021 | |
| CN | 109814082 B | 10/2021 | |
| CN | 113491043 A | 10/2021 | |
| CN | 214795200 U | 11/2021 | |
| CN | 214795206 U | 11/2021 | |
| CN | 214895784 U | 11/2021 | |
| CN | 214895810 U | 11/2021 | |
| CN | 215641806 U | 1/2022 | |
| CN | 112639527 B | 2/2022 | |
| CN | 215932142 U | 3/2022 | |
| CN | 112578396 B | 4/2022 | |
| DE | 4142702 A1 | 6/1993 | |
| EP | 0 757 257 A2 | 2/1997 | |
| EP | 1 237 305 A2 | 9/2002 | |
| EP | 1 923 721 A1 | 5/2008 | |
| EP | 2 157 445 A2 | 2/2010 | |
| EP | 2 395 368 A1 | 12/2011 | |
| EP | 2 889 642 A1 | 7/2015 | |
| EP | 4020005 A1 | 6/2022 | |
| GB | 1 427 164 A | 3/1976 | |
| GB | 2 000 411 A | 1/1979 | |
| JP | S628119 A | 1/1987 | |
| JP | H0683998 A | 3/1994 | |
| JP | 2007144667 A | 6/2007 | |
| JP | 2010035385 A | 2/2010 | |

(56) References Cited

FOREIGN PATENT DOCUMENTS

| | | |
|---|---|---|
| JP | 2017003347 A | 1/2017 |
| JP | 2017138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 9816801 A1 | 4/1998 |
| WO | 2017/110417 A1 | 6/2017 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018/175990 A1 | 9/2018 |
| WO | 2018/182812 A2 | 10/2018 |
| WO | 2019/079642 A1 | 4/2019 |
| WO | 2019/165095 A1 | 8/2019 |
| WO | 2019/165289 A1 | 8/2019 |
| WO | 2019/165294 A1 | 8/2019 |
| WO | 2020/013890 A2 | 1/2020 |
| WO | 2021035428 A1 | 3/2021 |

OTHER PUBLICATIONS

Notice of Allowance issued in Korean Patent Application No. 10-2021-7041437 dated Apr. 28, 2022, 6 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
European Search Report, dated Jul. 17, 2020, for EP Application No. 18776977.3, 12 pages.
European Search Report, dated Jun. 17, 2021, for EP Application No. 18868896.4, 7 pages.
Extended European Search Report, dated Jul. 10, 2020, for EP Application No. 18736738.8, 9 pages.
Extended European Search Report, dated Jul. 22, 2020, for EP Application No. 18736685.1, 10 pages.
Fiber laser, Wikipedia, https://en.wikipedia.org/wiki/Fiber_laser, 6 pages.
Gluckman, J. (May 13, 2016). "Design of the processing chain for a high-altitude, airborne, single-photon LiDAR mapping instrument," Proceedings of SPIE; [Proceedings of SPIE ISSN 0277-786X vol. 10524], SPIE, US, vol. 9832, 9 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
Gunzung, Kim, et al. (Mar. 2, 2016). "A hybrid 3D LiDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
International Preliminary Report on Patentability, dated Apr. 30, 2020, for International Application No. PCT/US2018/056577, 8 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jan. 3, 2019, for International Application No. PCT/US2018/056577, 15 pages.
International Search Report and Written Opinion, dated Jul. 9, 2019, for International Application No. PCT/US2019/018987, 17 pages.
International Search Report and Written Opinion, dated Jun. 7, 2018, for International Application No. PCT/US2018/024185, 9 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Mar. 23, 2018, for International Application No. PCT/US2018/012704, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Sep. 18, 2018, for International Application No. PCT/US2018/012116, 12 pages.
Mirrors, Physics LibreTexts, https://phys.libretexts.org/Bookshelves/Optics/Supplemental_Modules_(Components)/Mirrors, (2021), 2 pages.
Office Action Issued in Japanese Patent Application No. 2019-536019 dated Nov. 30, 2021, 6 pages.
"Why Wavelengths Matter in Fiber Optics", FirstLight, https://www.firstlight.net/why-wavelengths-matter-in-fiber-optics/, (2021), 5 pages.

* cited by examiner

COMPACT LIDAR DESIGN WITH HIGH RESOLUTION AND ULTRA-WIDE FIELD OF VIEW

CROSS-REFERENCE TO RELATED APPLICATIONS

This application is a continuation application of U.S. patent application Ser. No. 17/723,270, entitled "COMPACT LIDAR DESIGN WITH HIGH RESOLUTION AND ULTRA-WIDE FIELD OF VIEW," filed Apr. 18, 2022, which claims priority to U.S. Provisional Patent Application Ser. No. 63/178,467, filed Apr. 22, 2021, entitled "A COMPACT LIDAR DESIGN WITH HIGH RESOLUTION AND ULTRAWIDE FIELD OF VIEW". The contents of both applications are hereby incorporated by reference in their entireties for all purposes.

FIELD OF THE TECHNOLOGY

This disclosure relates generally to optical scanning and, more particularly, to a compact LiDAR device configured to perform high resolution scanning of an ultra-wide field-of-view.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

Embodiments of present disclosure are described below. In various embodiments, a compact LiDAR device is provided. The compact LiDAR device comprises a polygon mirror configured to scan an FOV in both the horizontal and vertical directions, thereby achieving a very compact size and an ultra-wide FOV. The polygon mirror comprises multiple reflective facets and at least some of the facets have non-90 degree tilt angles. The compact size of the LiDAR device enables the device to be disposed inside many small spaces in a vehicle including, for example, the headlight housing, the rear light housing, the rear-view mirrors, the corners of the vehicle body, etc. In one example, the compact LiDAR device can provide a horizontal FOV of about 120 degrees or more (about 240 degrees for using two such LiDAR devices) and a vertical FOV of about 90 degrees or more. The compact LiDAR device can enable scanning multiple detection zones with different scanning resolutions. A higher scanning resolution is desirable in certain regions-of-interest (ROI) areas. Typical or lower scanning resolution may be used for scanning non-ROI areas. The compact LiDAR device disclosed herein can dynamically adjust the scanning of ROI areas and non-ROI areas. Various embodiments of the compact LiDAR device are described in more detail below.

In one embodiment, a compact LiDAR device is provided. The compact LiDAR device includes a first mirror disposed to receive one or more light beams and a polygon mirror optically coupled to the first mirror. The polygon mirror comprises a plurality of reflective facets. For at least two of the plurality of reflective facets, each reflective facet is arranged such that: a first edge, a second edge, and a third edge of the reflective facet correspond to a first line, a second line, and a third line; the first line and the second line intersect to form a first internal angle of a plane comprising the reflective facet; and the first line and the third line intersect to form a second internal angle of the plane comprising the reflective facet. The first internal angle is an acute angle; and the second internal angle is an obtuse angle. The combination of the first mirror and the polygon mirror, when at least the polygon mirror is rotating, is configured to: steer the one or more light beams both vertically and horizontally to illuminate an object within a field-of-view, obtain return light formed based on the steered one or more light beams illuminating the object within the field-of-view, and redirect the return light to an optical receiver disposed in the LiDAR scanning system.

In one embodiment, a light detection and ranging (LiDAR) scanning system is provided. The LiDAR system includes a plurality of LiDAR devices mountable to at least two of a left side, a front side, a front side, and a back side of a vehicle. Each of the plurality of LiDAR devices includes a first mirror disposed to receive one or more light beams and a polygon mirror optically coupled to the first mirror. The polygon mirror includes a plurality of reflective facets. For at least two of the plurality of reflective facets, each reflective facet is arranged such that: a first edge, a second edge, and a third edge of the reflective facet corresponding to a first line, a second line, and a third line; the first line and the second line intersect to form a first internal angle of a plane comprising the reflective facet; and the first line and the third line intersect to form a second internal angle of a plane comprising the reflective facet. The first internal angle of the reflective facet is an acute angle; and the second internal angle of the respective plane is an obtuse angle.

In one embodiment, a vehicle comprising a light detection and ranging (LiDAR) scanning system is provided. The LiDAR scanning system includes a plurality of LiDAR devices mountable to at least two of a left side, a front side, a front side, and a back side of a vehicle. Each of the plurality of LiDAR devices includes a first mirror disposed to receive one or more light beams and a polygon mirror optically coupled to the first mirror. The polygon mirror includes a plurality of reflective facets. For at least two of the plurality of reflective facets, each reflective facet is arranged such that: a first edge, a second edge, and a third edge of the reflective facet corresponding to a first line, a second line, and a third line; the first line and the second line intersect to form a first internal angle of a plane comprising the reflective facet; and the first line and the third line intersect to form a second internal angle of a plane comprising the reflective facet. The first internal angle of the reflective facet is an acute angle; and the second internal angle of the respective plane is an obtuse angle.

In one embodiment, a method for scanning a field-of-view using a light detection and ranging (LiDAR) device is provided. The LiDAR device comprises a polygon mirror having a plurality of reflective facets. The method includes steering, by a first reflective facet of the plurality of reflective facets of the polygon mirror, light to scan a first part of the field-of-view in a vertical direction. The first reflective facet is associated with an acute tilt angle. The method further comprises steering, by a second reflective facet of the plurality of reflective facets of the polygon mirror, light to scan a second part of the field-of-view in a vertical direction. The second reflective facet is associated with an obtuse tilt angle. The method further includes generating scan lines corresponding to the first part of the field-of-view in the vertical direction; and generating scan lines corresponding to the second part of the field-of-view in the vertical direction.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
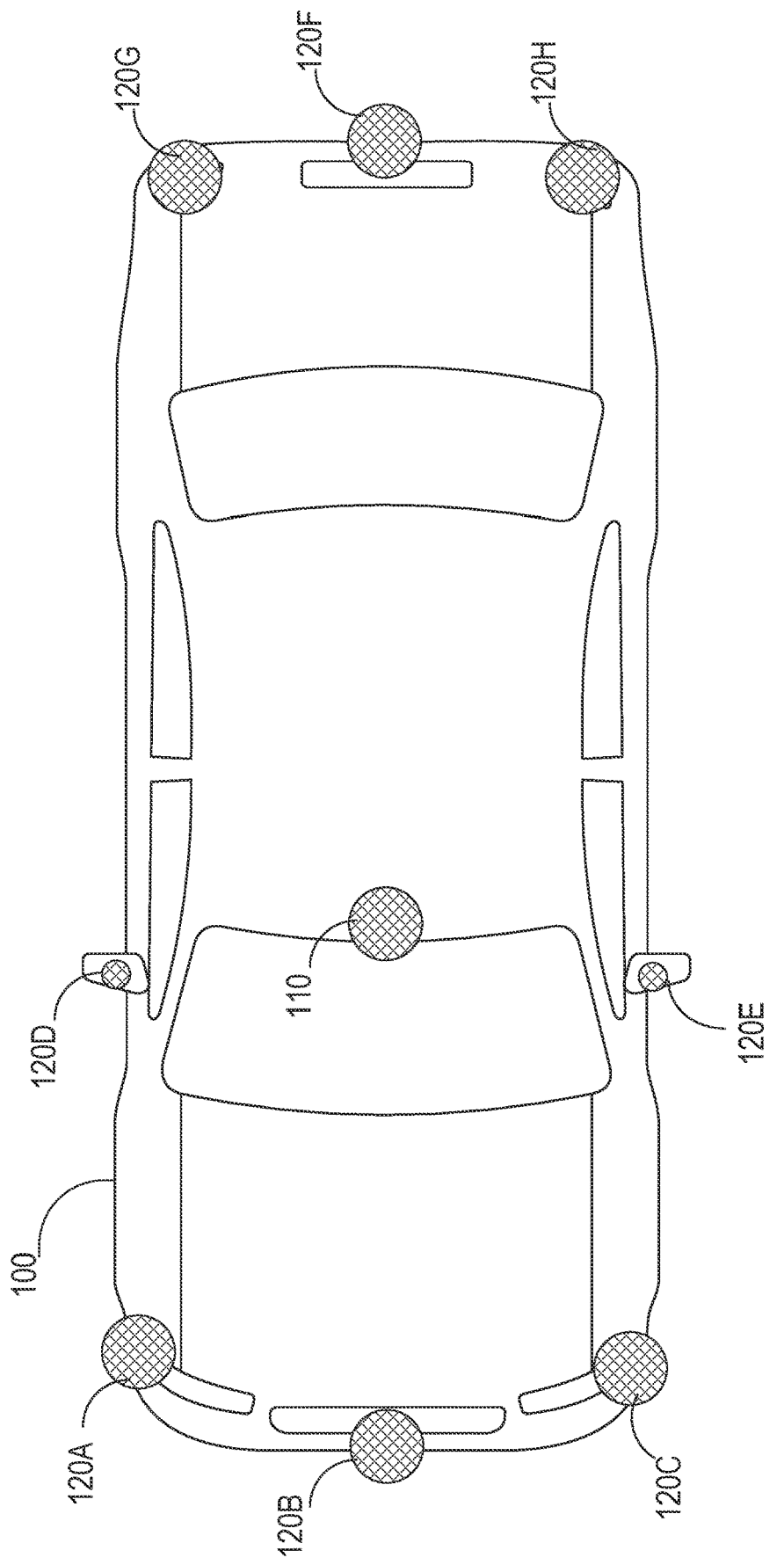
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first edge could be termed a second edge and, similarly, a second edge could be termed a first edge, without departing from the scope of the various described examples. The first edge and the second edge can both be edges and, in some cases, can be separate and different edges.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, Cold-Fire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR device is an important sensor that can provide data used in three-dimensional perception, autonomous driving, automation, and many other emerging technologies and industries. The basic operational principle of a LiDAR device is that it transmits laser light to illuminate an object in a field-of-view and receives return light formed from the scattered and/or reflected light. The distance to the object can be determined based on the time of the transmission light and the time of the return light. Existing LiDAR devices have many components that may make the device bulky. Thus, it may be difficult to fit an existing LiDAR device into a compact space such the rear-view mirror assembly, the light housing, the bumper, or the rooftop. Moreover, existing LiDAR devices often have limited FOVs even when they are mounted into a small space of a vehicle, because the small space limits the LiDAR's scanning capabilities. Therefore, there is a need for a compact LiDAR device that can fit into a small space and is still capable of performing scanning of a wide FOV.

Embodiments of present disclosure are described below. In various embodiments, a compact LiDAR device is provided. The compact LiDAR device comprises a polygon mirror configured to scan an FOV in both the horizontal and vertical directions, thereby achieving a very compact size and an ultra-wide FOV. The polygon mirror comprises multiple reflective facets and at least some of the facets have non-90 degree tilt angles. The compact size of the LiDAR device enables the device to be disposed inside many small spaces in a vehicle including, for example, the headlight housing, the rear light housing, the rear-view mirror assemblies, the corners of the vehicle body, etc. In one example, the compact LiDAR device can provide a horizontal FOV of about 120 degrees or greater (about 240 degrees for using two such LiDAR devices) and a vertical FOV of about 90 degrees or greater. The compact LiDAR device can enable scanning multiple detection zones with different scanning resolutions. A higher scanning resolution is desirable in certain regions-of-interest (ROI) areas. Typical or lower scanning resolution may be used for scanning non-ROI areas. The compact LiDAR device disclosed herein can dynamically adjust the scanning of ROI areas and non-ROI areas. Various embodiments of the compact LiDAR device are described in more detail below.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
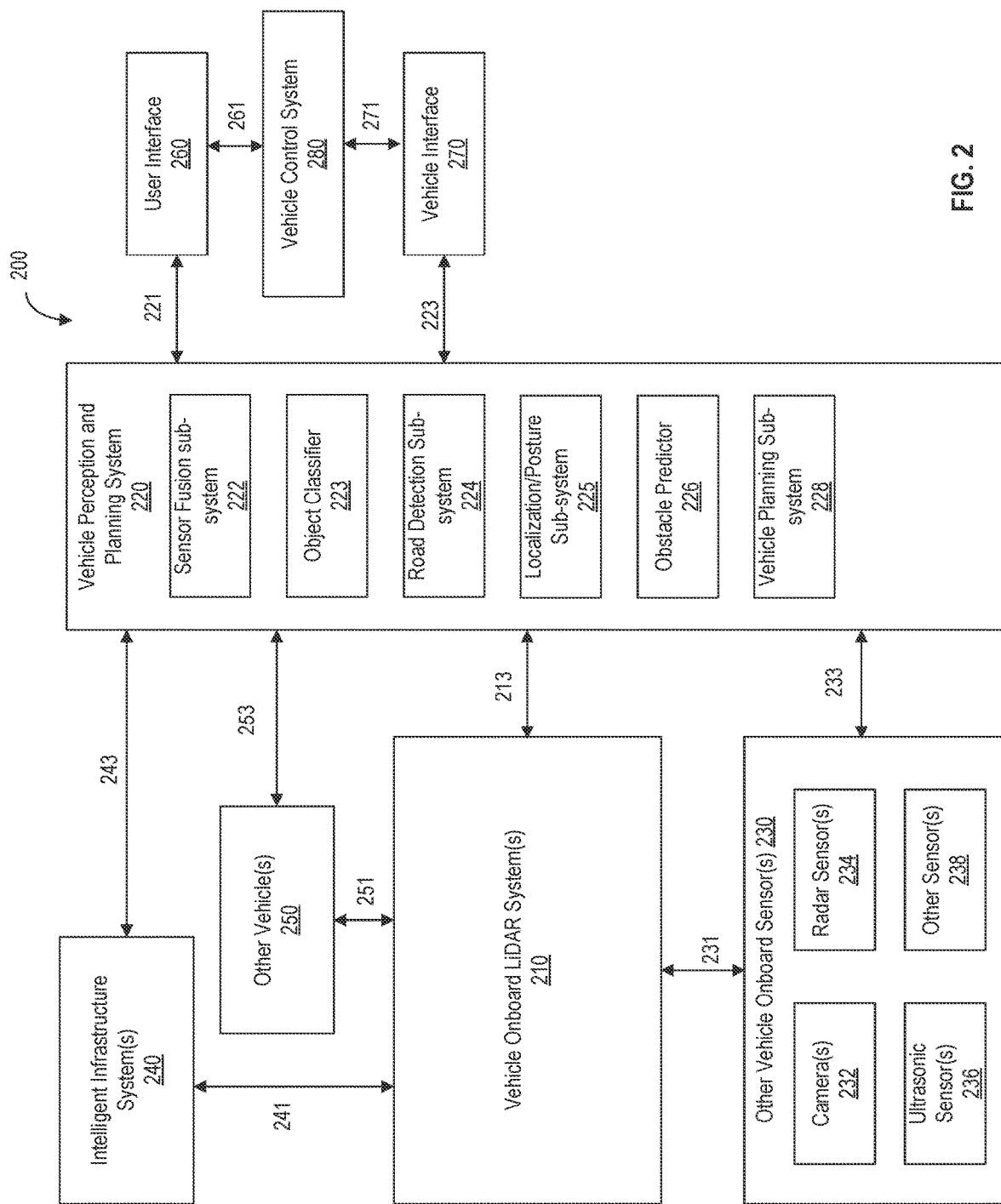
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
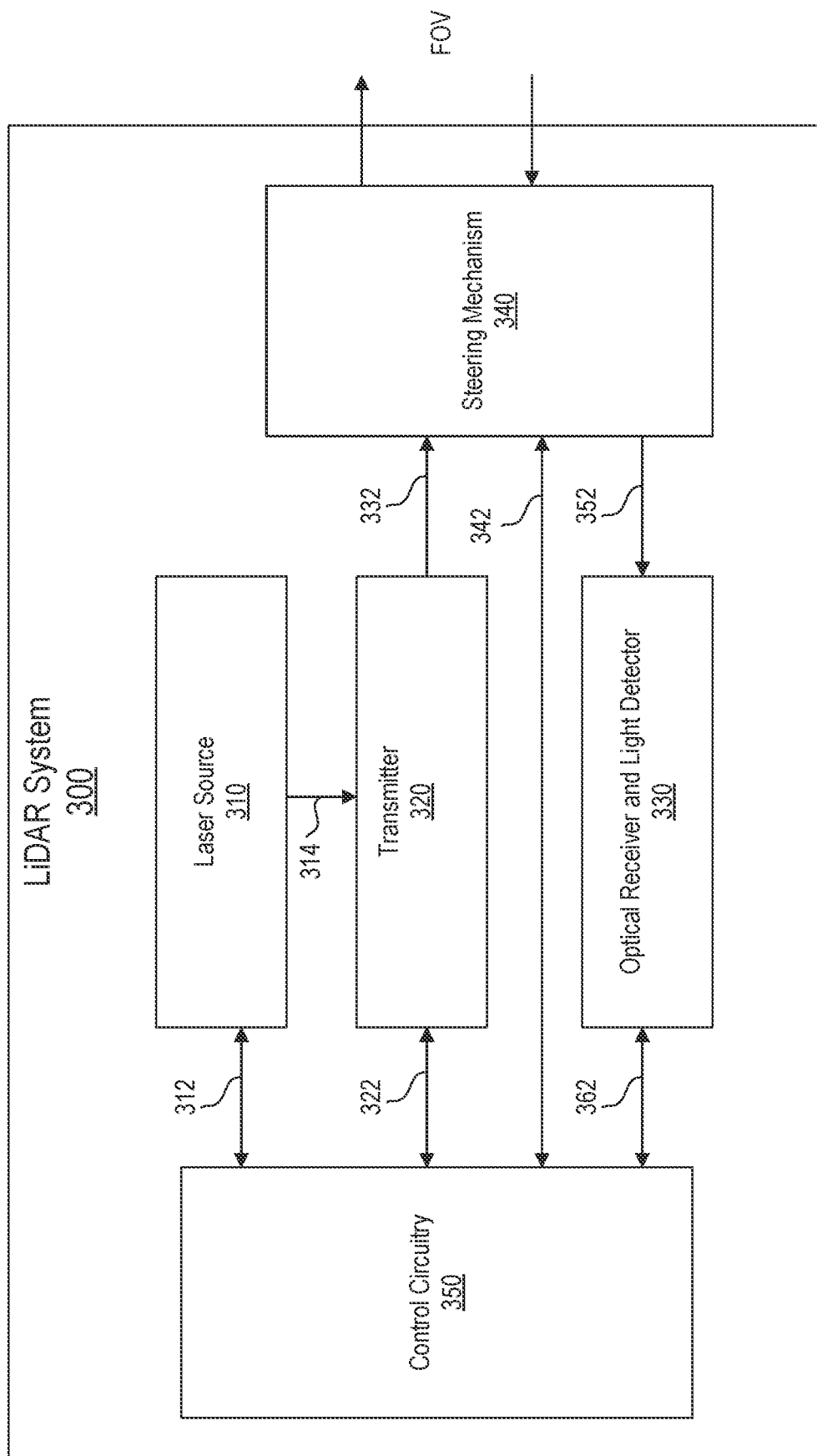
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:YVO$_4$) laser crystals.

Figure 4:
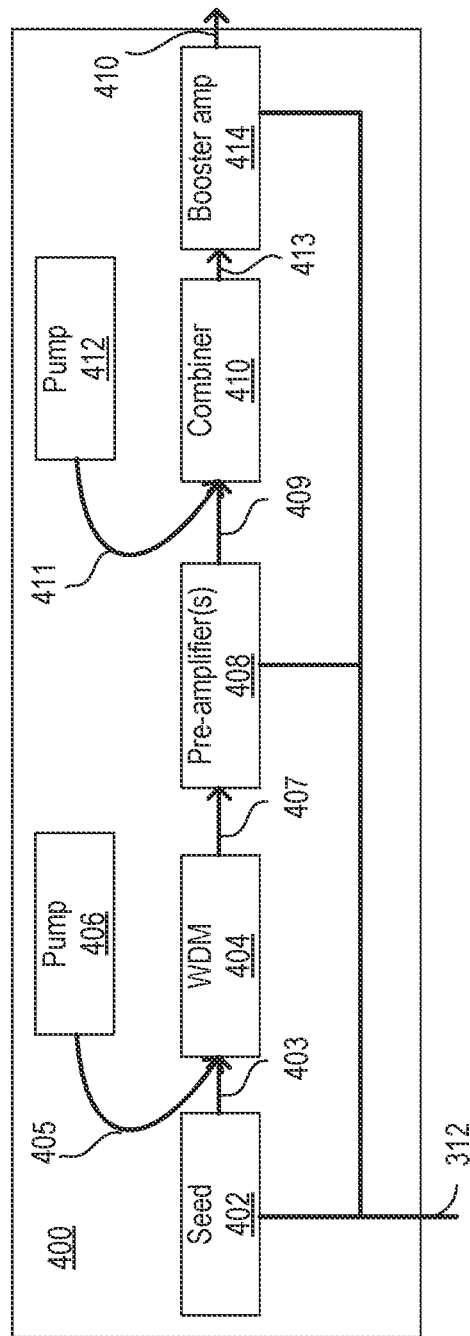
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, laser source 310 and/or transmitter 320 can be configured to meet, for example, a scan resolution requirement while maintaining the desired $M^2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340

(and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
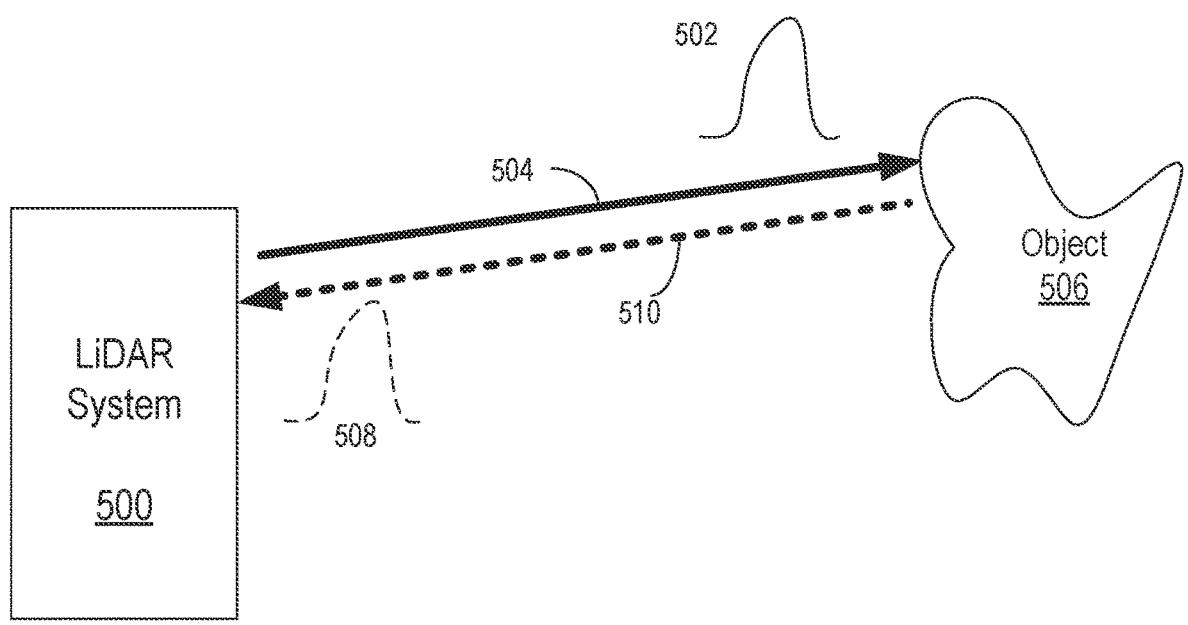
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
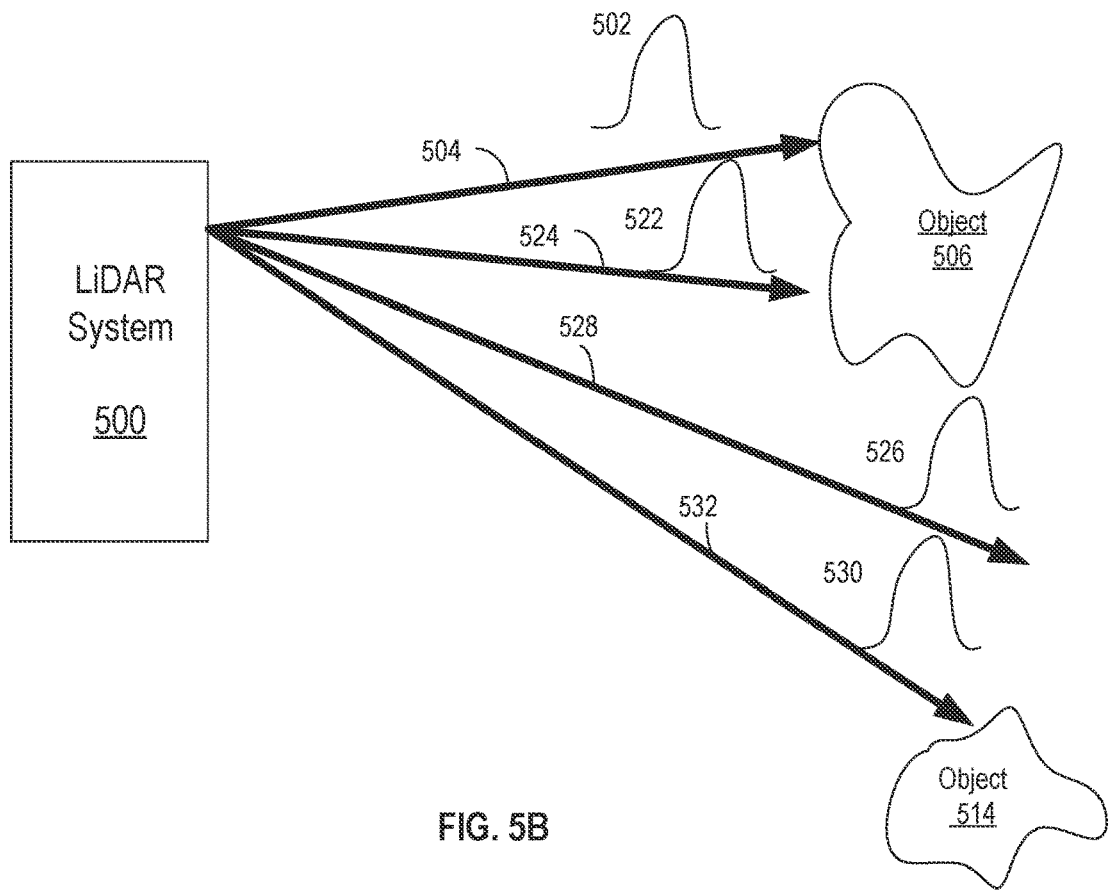
Figure 5C:
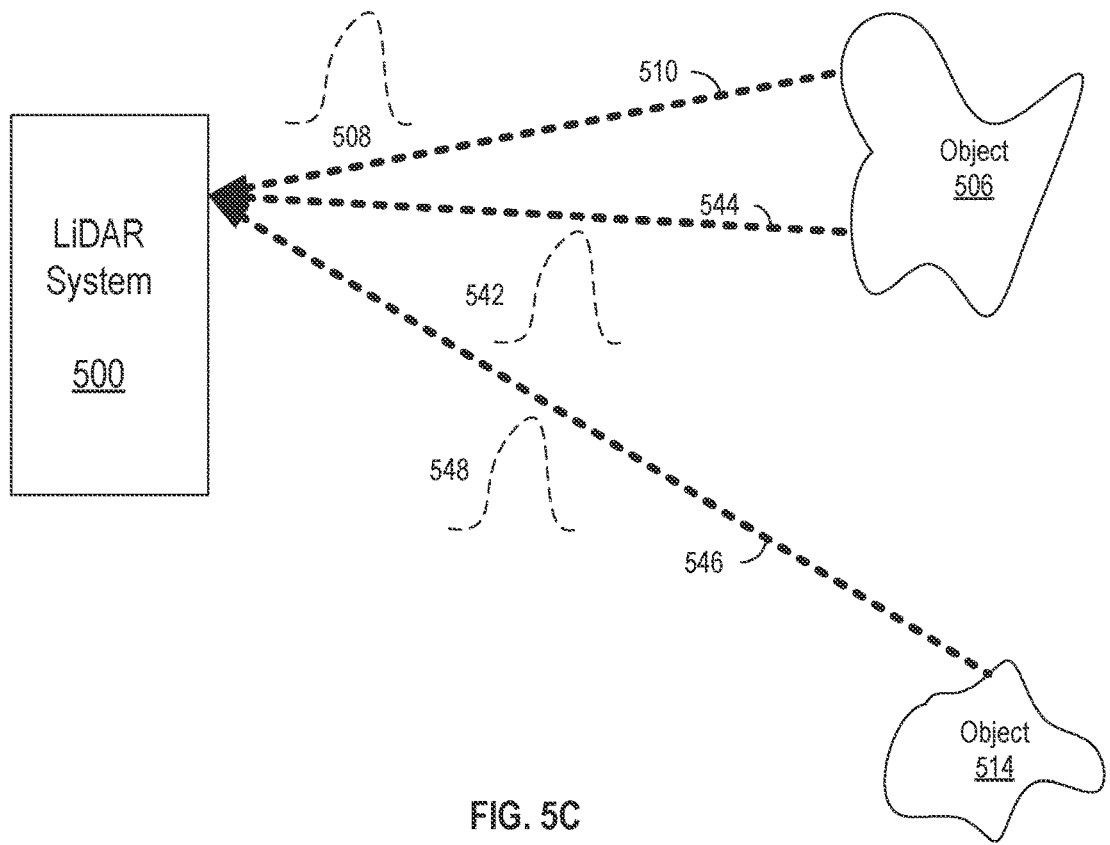

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 12:
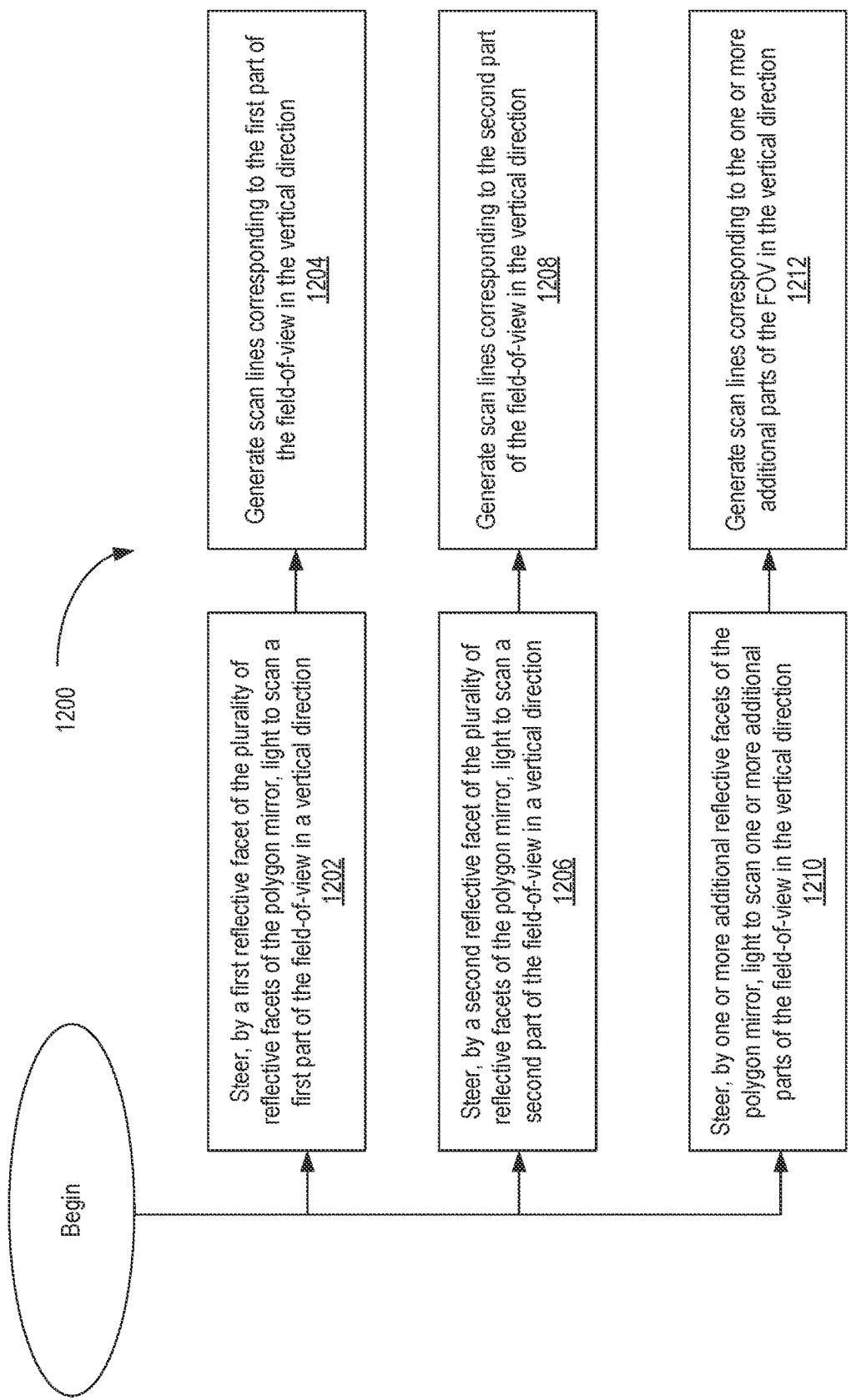
FIG. 12 is a flowchart illustrating a method for scanning a FOV using a compact LiDAR device disclosed herein, according to some embodiments.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
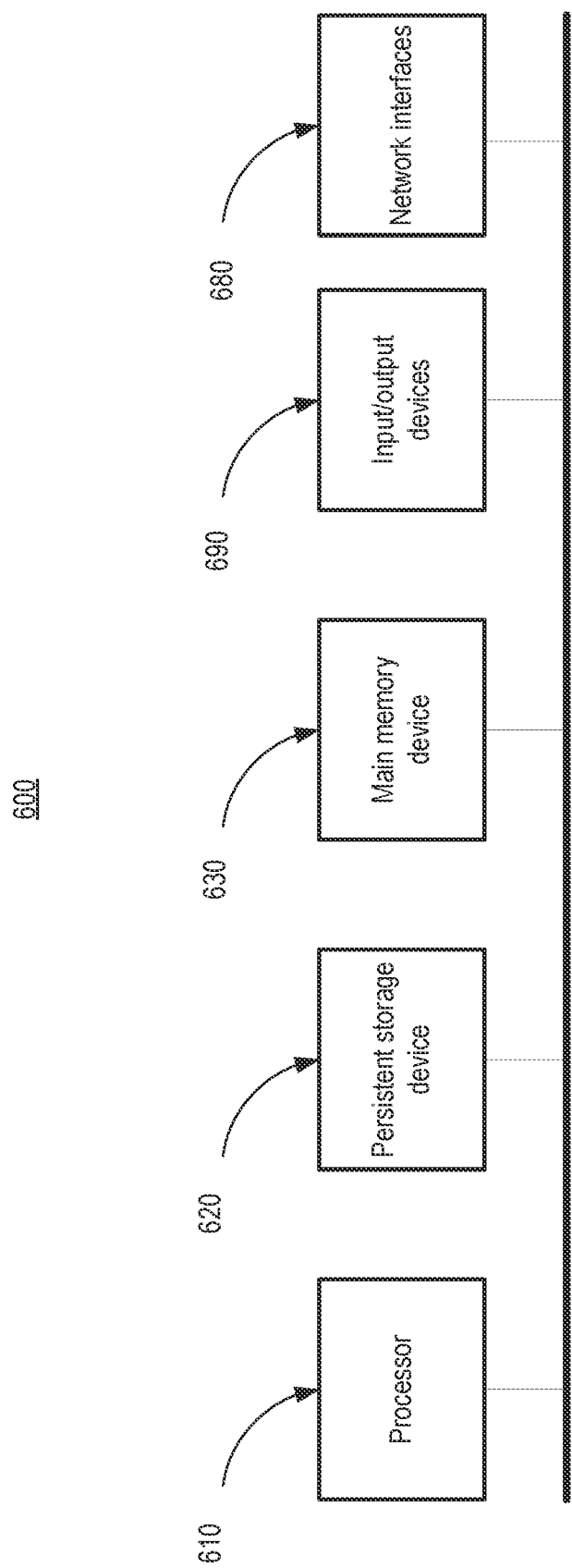
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of FIG. 12 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIG. 12. Accordingly, by executing the computer program instructions, the processor 610 executes an algorithm defined by the methods of FIGS. 3-5 and 12. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7A:
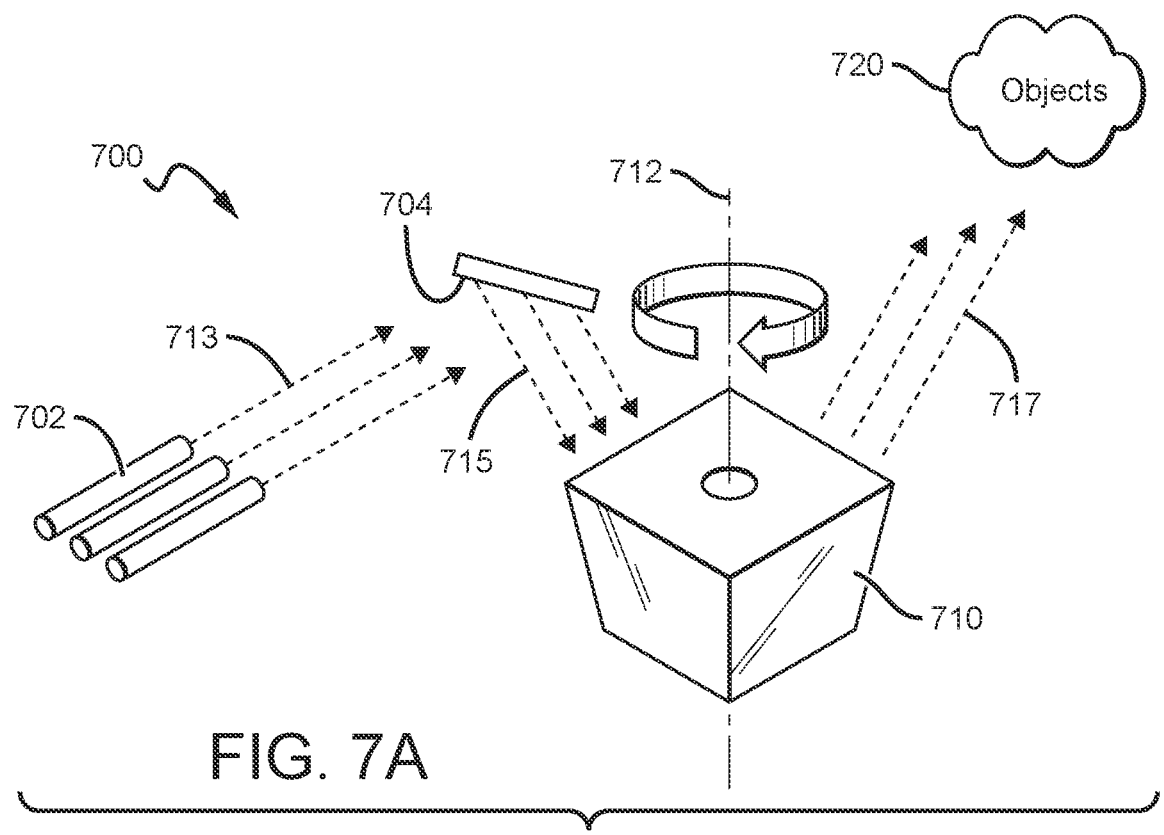
FIG. 7A illustrates a simplified compact LiDAR device comprising a polygon mirror for steering light, according to some embodiments.

FIG. 7A illustrates a simplified compact LiDAR device 700. Device 700 comprises a transceiver array 702, a mirror 704, and a polygon mirror 710. The transceiver array 702 comprises one or more transmitter providing one or more transmission light beams 713. Transceiver array 702 also includes one or more receivers for receiving return light. In the embodiment shown in FIG. 7A, the transmitters in the transceiver array 702 transmit multiple laser light beams 713, which are directed toward mirror 704. For example, the transceiver array 702 may transmit 2, 4, 6, 8, 16 light beams, thereby increasing the scanning resolution and speed. In one example, mirror 704 can be an un-moveable mirror (e.g., a mirror with a fixed position and orientation). In another example, mirror 704 can be a galvanometer mirror controllable to oscillate about an axis of mirror 704. If mirror 704 is an un-moveable mirror, the LiDAR device may overall have a smaller size than if mirror 704 is a galvanometer mirror. This is because a galvanometer mirror requires a motor to oscillate the mirror. Therefore, to make the LiDAR device more compact, an un-moveable mirror 704 can be used. If more space is available and a galvanometer mirror can be used as mirror 704, the oscillation of mirror 704 can facilitate increasing resolution of the LiDAR scan lines and increasing the vertical and/or horizontal FOVs.

Figure 7B:
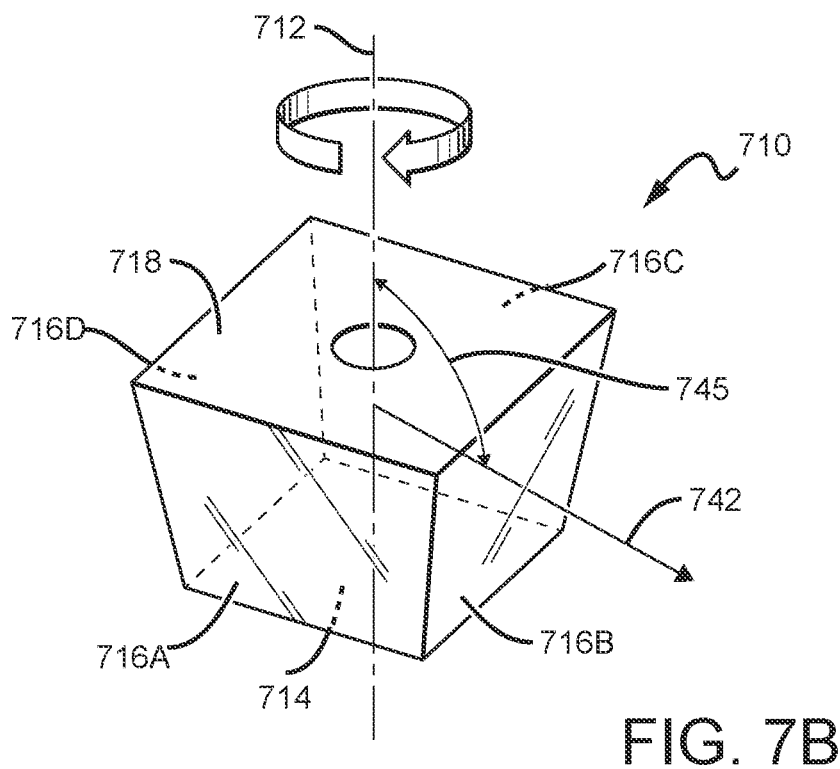
FIG. 7B illustrates a zoom-in view of the polygon mirror used in the compact LiDAR device shown in FIG. 7A, according to some embodiments.

As shown in FIG. 7A, mirror 704 reflects transmission light beams 713 to form transmission light 715. Transmission light 715 can include one or more transmission light beams. Light 715 is directed toward polygon mirror 710 for steering light to illuminate objects in an FOV 720. Polygon mirror 710 is thus optically coupled to mirror 704 and rotates about an axis 712 to steer light. In some embodiments, polygon mirror 710 comprises a plurality of reflective facets, for example, four, five, six, etc. facets. FIGS. 7A and 7B illustrate that polygon mirror 710 has four facets (e.g., two such facets 716A and 716B are shown in FIG. 7B). In some embodiments, multiple transmission light beams of light 715 are directed toward the same facet of polygon mirror 710 at any particular time. The same facet of polygon mirror 710 then redirects the light beams to form light 717. In some embodiments, multiple transmission light beams of light 715 are directed toward two or more facets of polygon mirror 710 at a particular time. Polygon mirror 710 then redirect the beams of light 715 to form transmission light 717.

As shown in FIG. 7A, light 717 comprises one or more transmission light beams. The combination of the mirror 704 and polygon mirror 710 can steer light 717 both horizontally and vertically to illuminate objects located in an FOV 720. In some embodiments, if mirror 704 is moveable, the movement of mirror 704 enables scanning light 717 in one direction (e.g., the vertical direction) and the movement of polygon mirror 710 enables scanning light 717 in another direction (e.g., the horizontal direction). In other embodiments, mirror 704 is un-moveable and therefore polygon mirror 710 is configured to enable the scanning in both horizontal and vertical directions. For example, facets of polygon mirror 710 can be configured to have different tilt angles such that when polygon mirror rotates about axis 712, it can direct light 717 in both horizontal and vertical directions. The configuration examples of polygon mirror 710 are described in greater detail below.

FIG. 7B illustrates a zoom-in view of the polygon mirror 710 used in the compact LiDAR device 700 shown in FIG. 7A, according to some embodiments. In some embodiments, polygon mirror 710 comprises a top surface 718, a bottom surface 714, and multiple reflective facets 716A-D (collectively as 716) that reflect light. Reflective facets 716 are disposed between the top and bottom surfaces of polygon mirror 710 and are therefore also referred to as side surfaces of polygon mirror 710. One embodiment of the polygon mirror 710 is shown in FIG. 7B, where it has a polygon-shaped top and bottom surfaces (e.g., square-shaped, rectangle-shaped, pentagon-shaped, hexagon shaped, octagon-shaped, or the like). In some embodiments, facets 716 comprise reflective surfaces (e.g., mirrors). As described above using FIG. 7A, facets 716 reflect transmission light 715 to form transmission light 717, which may include one or more transmission light beams for illuminating objects in a FOV 714. Polygon mirror 710 is configured to rotate about an axis 712 using, for example, a motor. Therefore, each facet of polygon mirror 710 takes turn to reflect light. In the present disclosure, oscillation means continuously moving back and forth in two opposite directions (e.g., clockwise and counterclockwise) within a predetermined angular range (e.g., 40 degrees, 80 degrees, etc. degrees) in a periodical or non-periodical manner. Rotation means continuously moving in only one direction for at least 360 degrees. Thus, polygon mirror 710 is configured to rotate continuously for at least 360 degrees. As described above, mirror 704 may be un-moveable at all or may be configured to oscillate between two angular positions.

In some embodiments, at any particular time, multiple transmission light beams of light 715 can be reflected by a same facet of polygon mirror 710 to form multiple transmission light beams of light 717. In some embodiments, multiple transmission light beams of light 715 are reflected by different facets of polygon mirror 710. When transmission light beams of light 717 travel to illuminate one or more objects in FOV 720, at least a portion of transmission light beams of light 717 is reflected or scattered to form return light (not shown). The return light is redirected (e.g., reflected) by polygon mirror 710 to form the first redirected return light (not shown), which is directed toward mirror 704. The first redirected return light is redirected again (e.g., reflected) by mirror 704 to form the second redirected return light, which is directed toward transceiver 702. In some embodiments, second redirected return light is collected first by a collection lens (not shown). The collection lens then directs the collected return light to transceiver 702. Transceiver 702 may include a receiver to receive and detect the return light. Thus, in some embodiments, polygon mirror 710 and mirror 704 are used for both transmitting light beams to illuminate objects in an FOV and for receiving and redirecting return light to a receiver of the LiDAR device 700. The use of polygon mirror 710 and mirror 704 for both steering transmission light out to the FOV and for steering return light back to the receiver makes the LiDAR device more compact.

In some embodiments, the first redirected return light is formed from multiple transmission light beams of light 717 and is reflected by a same facet of polygon mirror 710 at any particular time. In some embodiments, the first redirected return light is reflected by different facets of polygon mirror 710 at any particular time. The LiDAR device 700 shown in FIG. 7A is described in more detail in U.S. non-provisional patent application Ser. No. 16/682,774, filed on Nov. 14, 2018, entitled "LIDAR SYSTEMS THAT USE A MULTI-FACET MIRROR", the content of which is incorporated by reference in it is entirety for all purposes.

In some embodiments, at least one of facets 716 of polygon mirror 710 shown in FIG. 7B have a non-90 degree tile angle. A tilt angle is an angle between the normal direction of a facet and the rotational axis of the polygon mirror. Therefore, for a facet of polygon mirror 710, the tilt angle is between the direction perpendicular to a facet and its rotational axis 712. One such tilt angle 745 is shown in FIG. 7B as the angle formed by rotational axis 712 and the normal direction 742 of facet 716B. In the example shown in FIG. 7B, the tilt angle 745 is not a 90-degree angle. FIG. 7B illustrates that each facet 716A-D of polygon mirror 710 has a tilt angle that is not 90 degrees, thereby forming wedged facets. A wedged facet is not parallel to the rotational axis. For example, in FIG. 7B, facet 716B is not parallel to rotational axis 712. Therefore, the wedged facet or a cross-section of polygon mirror 710 may have a trapezoidal shape. It is understood that a facet of a polygon mirror can be configured to have a non-90 degree tilt angle or a 90-degree tilt angle. And different facets of a polygon mirror can have the same or different tilt angles.

Figure 8:
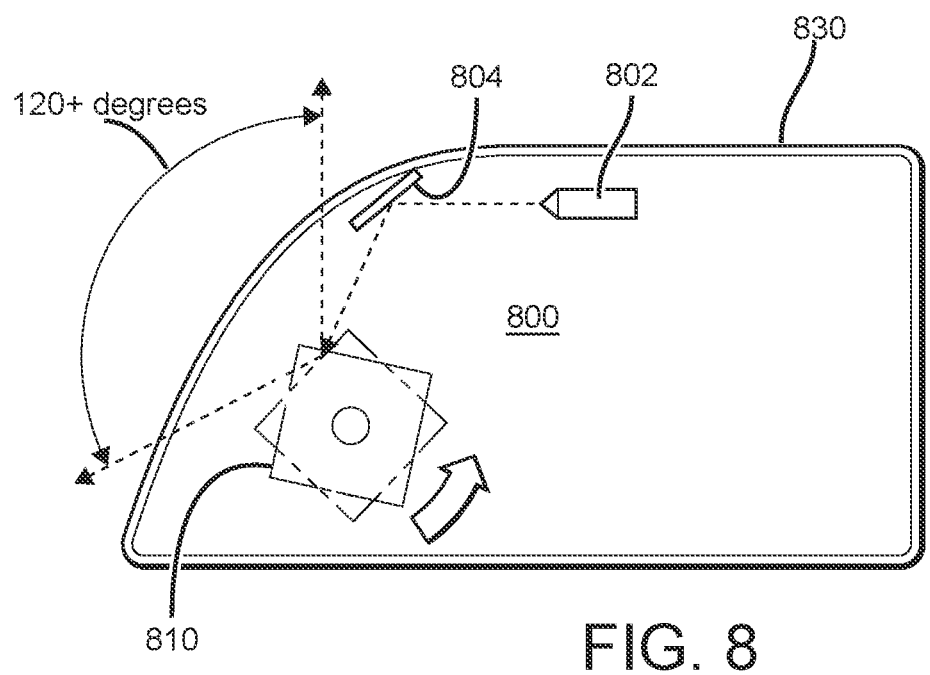
FIG. 8 illustrates a top view of a simplified LiDAR device enclosed in a rear-view mirror assembly of a vehicle, according to some embodiments.

FIG. 8 illustrates a top view of a rear-view mirror assembly 830 of a vehicle. The rear-review mirror assembly 830 comprises a simplified LiDAR device 800 mounted therein. Similar to the embodiment shown in FIG. 7A, the LiDAR device 800 shown in FIG. 8 comprises transceiver array 802, a mirror 804, and a polygon mirror 810. These components of the LiDAR device 800 are the same or similar to those described above, and are thus not repeatedly described. As shown in FIG. 8, dimensions of transceiver array 802, mirror 804, and polygon mirror 810 can be configured such that they are enclosed in rear-view mirror assembly 830. In some embodiments, other components of the LiDAR device 800 may also be disposed within rear-view mirror assembly 830. It is understood that these components may also configured to be enclosed in another small space such as a light housing of a vehicle, a corner space of a vehicle, etc. In some embodiments, one or more transceivers, a polygon mirror, and a mirror (e.g., a fixed or galvanometer mirror) are enclosable into a space having a length of about 2-6 inches, a width of about 2-6 inches, and a height of about 1-4 inches.

As shown in FIG. 8, transceiver array 802, mirror 804, and polygon mirror 810 are disposed within rear-view mirror assembly 830 in a manner such that the LiDAR device 800 can scan a horizontal FOV of about or more than 120 degrees. FIG. 8 shows a top view of rear-view mirror assembly 830 (e.g., the viewing direction is perpendicular to the road surface and is parallel to the rear-view mirror of assembly 830). In FIG. 8, polygon mirror 810 is mounted such that its rotational axis is perpendicular to the road surface. Therefore, in the embodiment shown in FIG. 8, the polygon mirror 810, when rotating about its rotational axis, can scan transmission light beams and receive return light in the horizontal direction of the FOV. The horizontal FOV can be about 120 degrees or greater. As described below in greater detail, the facet tilt angles of polygon mirror 810 can also be arranged such that it can also scan transmission light beams and receive return light in the vertical direction of the FOV. It is understood that polygon mirror 810 can be configured and disposed in any desired manner within rear-view mirror assembly 830 to scan transmission light beams and receive return light in one or both the horizontal direction and the vertical direction.

In some embodiments, the front cover of rear-view mirror assembly 830 of a vehicle is made of infrared (IR) polycarbonate materials such that infrared light can be transmitted in and out of the front cover of the rear-view mirror assembly 830, but lights in other wavelengths cannot. For example, the light beams of a LiDAR device may have the wavelength of about 850 nm, about 905 nm, about 940 nm, about 1064 nm, about 1550 nm, about 2000 nm, or any other infrared wavelength ranges. Therefore, these infrared light beams can be transmitted to the FOV through the front cover of rear-view mirror assembly 830 and the return light can also be received through the front cover. If the LiDAR device 800 is mounted in other parts of the vehicle, similar IR polycarbonate materials can be used to allow infrared light to travel through.

FIGS. 9A-9D illustrates polygon mirror 900, 930, 960, and 990. These different embodiments can be used to implement polygon mirror 710 and 810 described above. For each of the different embodiments of polygon mirrors shown in FIGS. 9A-9D, at least two reflective facets of the polygon mirror are arranged in the following manner. For the at least two reflective facets, each facet is arranged such that a first edge, a second edge, and a third edge of the reflective facet correspond to a first line, a second line, and a third line; the first line and the second line intersect to form a first internal angle of a plane comprising the reflective facet; and the first line and the third line intersect to form a second internal angle of the plane comprising the reflective facet. The first internal angle is an acute angle, and the second internal angle is an obtuse angle.

Figure 9A:
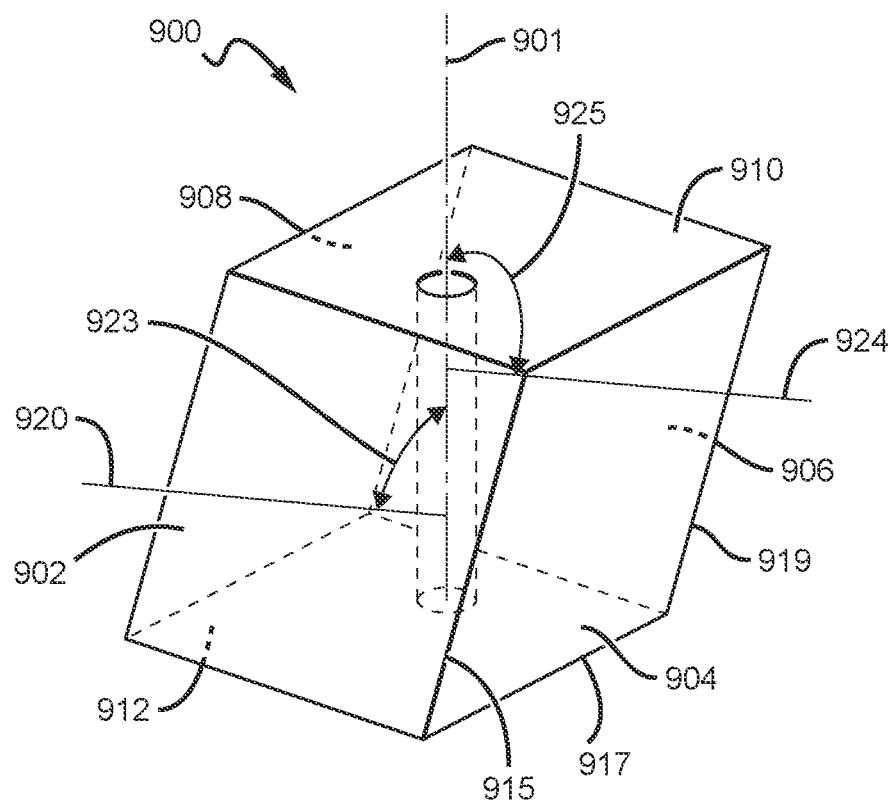
FIGS. 9A-9D illustrates several configurations of a polygon mirror, according to some embodiments.

Using polygon mirror 900 as an example, polygon mirror 900 comprises a top surface 910, a bottom surface 912, and multiple facets 902, 904, 906, and 908 (e.g., the four side surfaces). Facets 902, 904, 906, and 908 can also be designated as a left reflective facet, a front reflective facet, a right reflective facet, and a back reflective facet. Facets 902, 904, 906, and 908 reflect light and therefore are also referred to as reflective facets. In one embodiment as illustrated by polygon mirror 900, facets 904 and 908 (e.g., the front and back facets) are parallelogram-shaped facets and facets 902 and 906 (e.g., the left and right facets) are rectangle-shaped facets. As shown in FIG. 9A, facet 904 comprises three edges 915, 917, and 919. These three edges correspond to three lines. For instances, a first line can include a part of edge 917, entire edge 917, or an extended line of edge 917 (e.g., the extended straight line of edge 917). Similarly, a second line can include a part of edge 915, entire edge 915, or an extended line of edge 915 (e.g., the extended straight line of edge 915). And a third line can include a part of edge 919, entire edge 919, or an extend line of edge 919 (e.g., the extended straight line of edge 919). The first line (corresponding to edge 917) and the second line (corresponding to edge 915) form a first internal angle of a 2-dimensional plane that comprises facet 904. The first internal angle is an acute angle (e.g., an angle that is less than 90 degrees). The first line (corresponding to edge 917) and the third line (corresponding to edge 919) form a second internal angle of the plane that comprises facet 904. The second internal angle is an obtuse angle (e.g., an angle that is greater than 90 degrees but less than 180 degrees). In one embodiment, facet 904 is a parallelogram-shaped facet. Similarly, facet 908 can also be a parallelogram-shaped facet. A parallelogram-shaped facet has non-90 degree internal angles. In other embodiments, facets 904 and 908 may have an acute internal angle and an obtuse internal angle, but may not be parallelogram-shaped facets. For example, they may have a trapezoidal shape or any other desired shaped.

In the embodiment shown in FIG. 9A, facets 902 and 906 are rectangle-shaped facets. Thus, the internal angles of the respective 2-dimensional planes comprising facets 902 and 906 are all 90-degree angles. Because facets 904 and 908 do not have all 90-degree internal angles (e.g., they are parallelogram-shaped facets), facets 902 and 906 have non-90 degree tilt angles. A tilt angle of a reflective facet is an angle between the normal direction of the reflective facet and an axis about which the polygon mirror is rotatable. Thus, for facet 902, its tilt angle 923 is the angle formed by its normal direction 920 and rotational axis 901 of polygon mirror 900. This tilt angle 923 is a non-90 degree angle (e.g., an acute angle). If tilt angle 923 is an acute angle, facet 902 is tilted such that it can direct transmission light toward, or receive return light from, an upper part of a vertical direction of the FOV. Similarly, for facet 906, its tilt angle 925 is formed by its normal direction 924 and rotational axis 901 of polygon mirror 900. This tilt angle 925 is also a non-90 degree angle (e.g., an obtuse angle). If tilt angle 925 is an obtuse angle, facet 906 is tilted such that it can direct transmission light toward, or receive return light from, a lower part of the vertical direction of the FOV.

In the embodiments of polygon mirror 900, facets 904 and 908 may not be tilted. Thus, facets 904 and 908 may have 90-degree tilt angles. The normal directions of facets 904 and 908 are thus perpendicular to the rotational axis 901 of polygon mirror 900. As such, facets 904 and 908 can direct transmission light toward, or receive return light from, a middle part of the vertical direction of the FOV. The tilt angles of facets 902, 904, 906, and 908 are therefore configured to enable scanning of the entire or a substantial portion of the vertical direction of the FOV. In one embodiment, the vertical FOV coverage is about or greater than 90 degrees. In the embodiment of polygon mirror 900, top surface 910 and bottom surface 912 can both be parallelogram-shaped surfaces As described above, top surface 910 and bottom surface 912 are not configured to direct light and thus can be non-reflective surfaces.

Figure 9B:
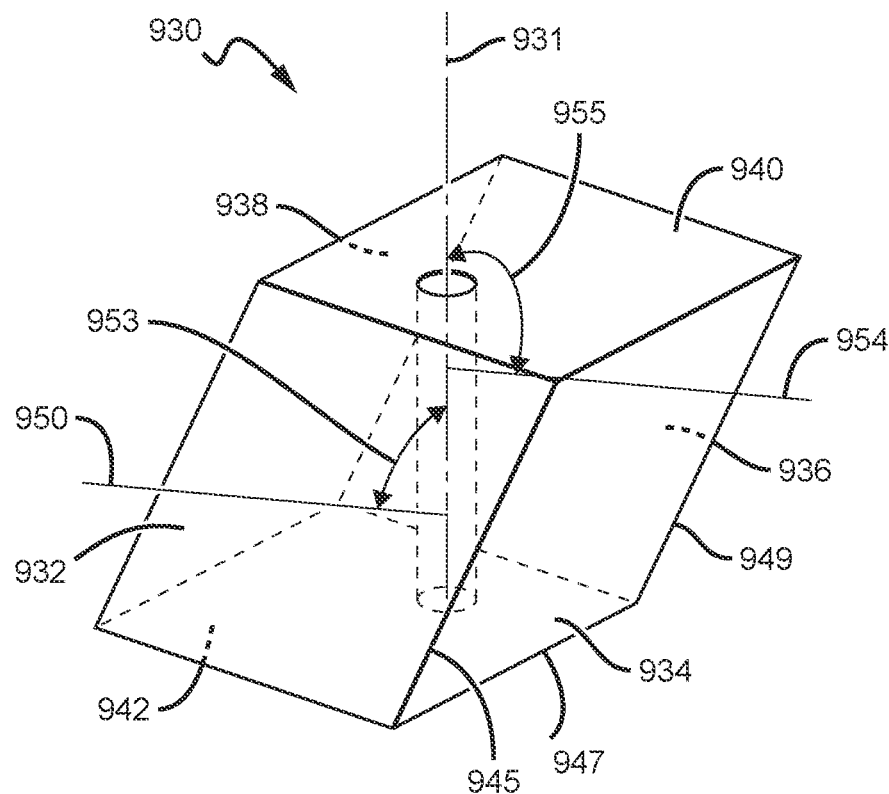

Turning now to the embodiment in FIG. 9B, polygon mirror 930 comprises a top surface 940, a bottom surface 942, and multiple facets 932, 934, 936, and 938 (e.g., the four side surfaces). Facets 932, 934, 936, and 938 can also be designated as a left reflective facet, a front reflective facet, a right reflective facet, and a back reflective facet. Facets 932, 934, 936, and 938 reflect light and therefore are also referred to as reflective facets. For polygon mirror 930, all facets 932, 934, 936 and 938 (e.g., the left, right, front, and back facets) are parallelogram-shaped facets. As shown in FIG. 9B, facet 934 comprises three edges 945, 947, and 949. These three edges correspond to three lines. For instances, a first line can include a part of edge 947, the entire edge 947, or an extended line of edge 947 (e.g., the extended straight line of edge 947). Similarly, a second line can include a part of edge 945, the entire edge 945, or an extended line of edge 945 (e.g., the extended straight line of edge 945). And a third line can include a part of edge 949, the entire edge 949, or an extend line of edge 949 (e.g., the extended straight line of edge 949). The first line corresponding to edge 947 and the second line corresponding to edge 945 form a first internal angle of a 2-dimensional plane that comprises facet 934. The first internal angle is an acute angle (e.g., an angle that is less than 90 degrees). The first line (corresponding to edge 947) and the third line (corresponding to edge 949) form a second internal angle of the plane that comprises facet 934. The second internal angle is an obtuse angle (e.g., an angle that is greater than 90 degrees but less than 180 degrees). In one embodiment, facet 934 is a parallelogram-shaped facet. Similarly, facet 938 is also parallelogram-shaped facets. Both faces 934 and 938 (e.g., the front and back facets) have non-90 degree internal angles. In other embodiments, facets 934 and 938 may have an acute internal angle and an obtuse internal angle, but may not be parallelogram-shaped facets. For example, they may have a trapezoidal shape or any other desired shaped.

In the embodiment shown in FIG. 9B, the internal angles of the respective 2-dimensional planes comprising facets 932 and 936 may not be 90-degree angles. Similar to those described above, the internal angles of the 2-dimensional plane comprising facets 932 and 936 may have one obtuse angle and one acute angle. In one embodiment, facets 932 and 936 may be parallelogram-shaped facets. They can have any other desired shapes (e.g., trapezoidal shape). Because facets 934 and 938 have non-90 degree internal angles (e.g., they are parallelogram-shaped facets), facets 932 and 936 have non-90 degree tilt angles. Similar to those described above with respect to facets 902 and 904 of polygon mirror 900, facets 932 and 934 of polygon mirror 930 have non-90 degree tilt angles (e.g., tilt angle 953 of facet 932 is an acute angle and tilt angle 955 of facet 936 is an obtuse angle). Because of their tilt angles, facets 932 and 934 can direct transmission light toward, or receive return light from, an upper part and a lower part, respectively, of a vertical direction of the FOV.

Similarly, because facets 932 and 936 (e.g., the left and right facets) of polygon mirror 930 have non-90 degree internal angles (e.g., they are parallelogram-shaped facets), facets 934 and 938 (e.g., the front and back facets) also have non-90 degree tilt angles (e.g., the tilt angle of facet 934 may be an obtuse angle and the tilt angle of facet 938 may be an acute angle). As such, facets 934 and 938 can direct transmission light toward, or receive return light from, different portions of the middle part of the vertical direction of the FOV. Because the tilt angles of facets 934 and 938 are different, these two facets can be used to scan different portions of the middle parts of the vertical direction of the FOV. For example, facet 934 may be used to scan the lower middle part and facet 938 may be used to scan the upper middle part. Scan lines obtained using facets 934 and 938 may thus be interleaved (shown as example scan lines 1014 and 1018 in FIG. 10 below). The tilt angles of facets 932, 934, 936, and 938 are therefore configured to enable scanning of the entire or a substantial portion of the vertical direction of the FOV. In one embodiment, the vertical FOV coverage is about or more than 90 degrees. In the embodiment of polygon mirror 930, top surface 940 and bottom surface 942 can be both parallelogram-shaped surfaces or rectangle-shaped surfaces. As described above, the top surface 940 and bottom surface 942 are not configured to direct light and thus can be non-reflective surfaces.

Figure 9C:
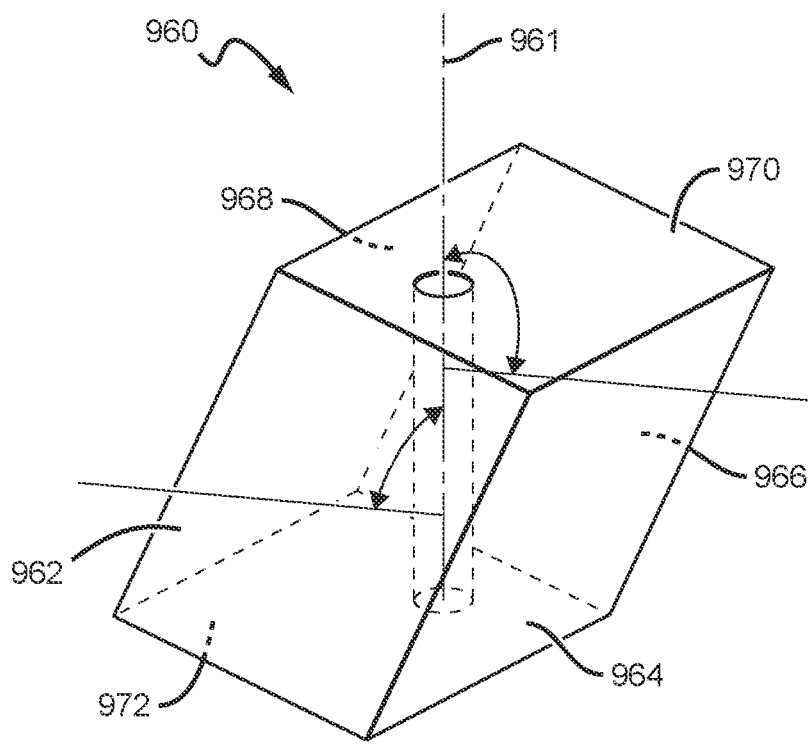

Turning now to the embodiment in FIG. 9C, polygon mirror 960 comprises a top surface 970, a bottom surface 972, and multiple facets 962, 964, 966, and 968 (e.g., the four side surfaces). Facets 962, 964, 966, and 968 can also be designated as a left reflective facet, a front reflective facet, a right reflective facet, and a back reflective facet. Facets 962, 964, 966, and 968 reflect light and therefore are also referred to as reflective facets. In one embodiment illustrated by polygon mirror 960, facets 962 and 966 (e.g., the left and right facets) are parallelogram-shaped facets; and facets 964 and 968 (e.g., the front and back facets) are rectangular shaped facets. Therefore, 2-dimensional planes comprising facets 962 and 966 have non-90 degree internal angles. And 2-dimensional planes comprising facets 964 and 968 have 90-degree internal angles.

In the embodiment shown in FIG. 9C, because facets 962 and 966 have non-90 degree internal angles (e.g., they are parallelogram-shaped facets), facets 964 and 968 (e.g., the front and back facets) have non-90 degree tilt angles. Similar to those described above, the tilt angle of facet 968 is an acute angle and tilt angle of facet 964 is an obtuse angle). Because of their tilt angles, facets 964 and 968 can direct transmission light toward, or receive return light from, a lower part and an upper part, respectively, of a vertical direction of the FOV. Thus, in this embodiment, the front and back facets are used for scanning the lower and upper parts of the vertical FOV, respectively.

In the embodiments of polygon mirror 960, facets 962 and 966 may not be tilted. Thus, facets 962 and 966 may have 90-degree tilt angles. The normal directions of facets 962 and 966 are perpendicular to the rotational axis 961 of polygon mirror 900. As such, facets 962 and 966 (e.g., the left and right facets) can direct transmission light toward, or receive return light from, a middle part of the vertical direction of the FOV. The tilt angles of facets 962, 964, 966, and 968 are therefore configured to enable scanning the entire or a substantial portion of the vertical direction of the FOV. In one embodiment, the vertical FOV coverage is about or greater than 90 degrees. In the embodiment of polygon mirror 960, top surface 970 and bottom surface 972 can be both be parallelogram-shaped surfaces or rectangle-shaped surfaces.

Figure 9D:
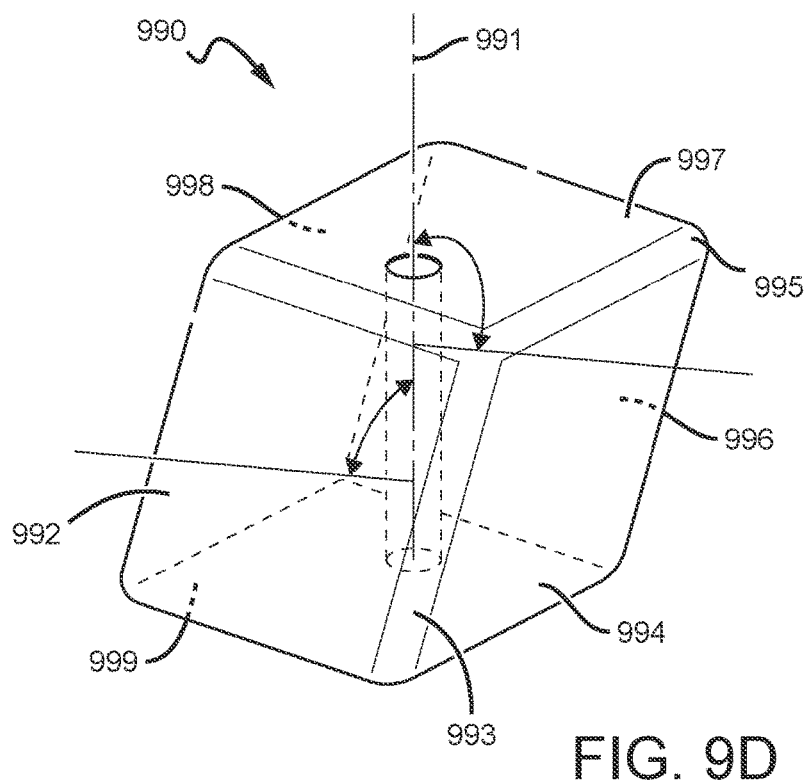

FIG. 9D illustrates a polygon mirror 990, which can be similar to any of the polygon mirror 900, 930, and 960 described above. Polygon mirror 990, in addition, comprises chamfered edges. For example, edges 993 and 995 of polygon mirror 990 can be rounded edges, sloped edges, beveled edges, curved edges, etc.

Polygon mirror 900, 930, 960, and 990 described above are for illustration purposes. It is understood that various characteristics (e.g., the internal angles of the facets, the tilt angles of the facets, the dimension of the facets, the shape of the facets, etc.) of the polygon mirror can also be configured to scan an FOV according to any desired scanning requirements (e.g., angular scanning ranges in the horizontal and vertical directions). As one example, at least one of the multiple reflective facets of a polygon mirror can have a tilt angle that is different from the tilt angles of the other reflective facets. As another example, each of the reflective facets of a polygon mirror may have a tilt angle that is different from tilt angles of the other reflective facets. As another example, two opposite reflective facets of a polygon mirror (e.g., the front and back facets of polygon mirror 900, the left and right facets of polygon mirror 960) can have a first tilt angle; and two other opposite reflective facets can have a second tilt angle. The first tilt angle can be the same as or different from the second tilt angle. As another example, two opposite reflective facets may have different tilt angles. For instance, facets 902 and 906 (the left and right facets) of polygon mirror 900 in FIG. 9A have different tilt angles (one acute angle and on obtuse angle). The two opposite facets 716B and 716D of polygon mirror 710 have the same tilt angle. In some embodiments, the difference between the tilt angles of the multiple facets of the polygon mirror is between about 10 degrees to +10 degrees.

Figure 10:
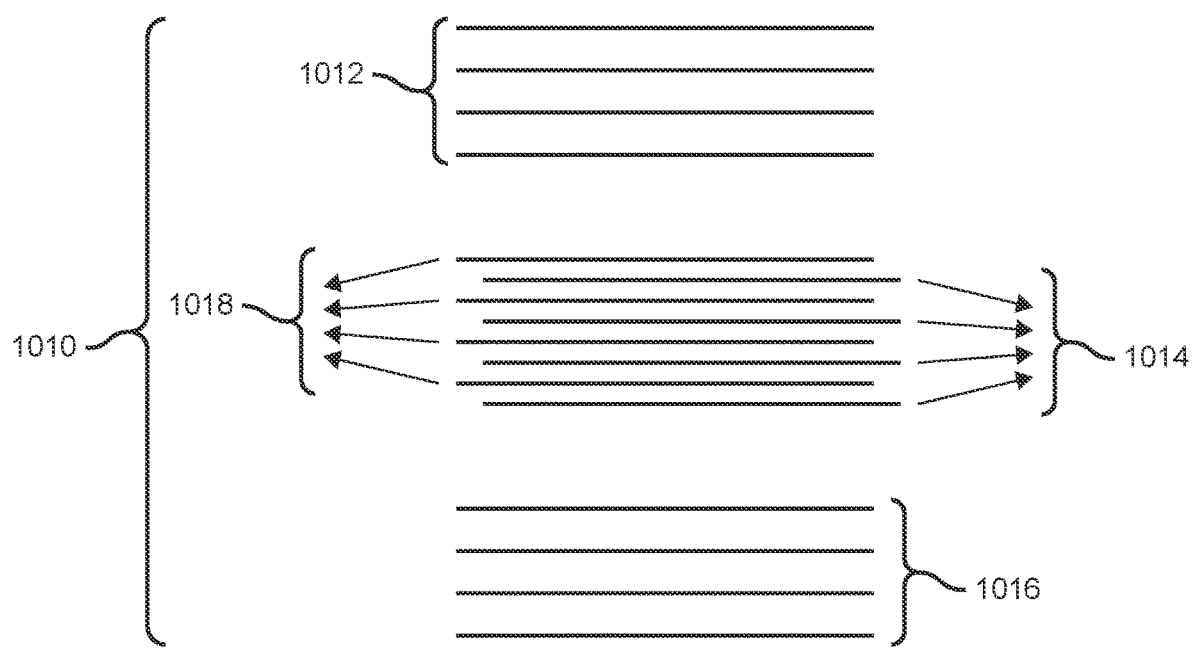
FIG. 10 illustrates an example LiDAR scanning pattern using a compact LiDAR device disclosed herein, according to some embodiments.

FIG. 10 illustrates an example LiDAR scanning pattern 1010 using some embodiments of a polygon mirror disclosed herein, according to some embodiments. As described above, by configuring the polygon mirror to have different characteristics (e.g., parallelogram-shaped facets, different tilt angles between facets, or the like), the polygon mirror can be used to scan the FOV in both the horizontal and vertical directions when it rotates about the rotational axis. In one embodiment, the scanning of the FOV in the horizontal direction is enabled by the rotation of the polygon mirror (e.g., at a speed of a few thousands rounds per minute). In some embodiments, the polygon mirror is configured to scan a horizontal FOV of about or greater than 120 degrees. The scanning of the FOV in the vertical direction is enabled by the configurations of the polygon mirror including, for example, the non-90 degree tilt angles of one or more facets.

FIG. 10 illustrates a scanning pattern 1010 obtained using polygon mirror 930 shown in FIG. 9B. As described above, for polygon mirror 930, facet 932 (e.g., the left facet) is configured to have an acute tilt angle and facet 936 is configured to have an obtuse tilt angle. The acute tilt angle of facet 932 facilitates generating of LiDAR scan lines 1012 corresponding to a first part of a vertical FOV. The first part of the vertical FOV in FIG. 10 can be the upper part of the vertical FOV. Facet 936 (e.g., the right facet) of polygon mirror 930 is configured to have an obtuse tilt angle, which facilitates generating of LiDAR scan lines 1016 corresponding to a second part of a vertical FOV. The second part of the vertical FOV can be the lower part of the vertical FOV. Thus, in this example, the first part of the vertical FOV and the second part of the vertical FOV are at the two end parts of the vertical FOV.

FIG. 10 further illustrates LiDAR scan lines 1014 and 1018, which are generated by facets 934 and 938 (e.g., the front and back facets). As described above, facets 934 and 938 have non-90 degree tilt angles (e.g., they are not parallel to the rotational axis 901). Facets 934 and 938 facilitate generating of LiDAR scan lines 1014 and 1018, which correspond to the middle part of the vertical FOV. In some embodiments, the polygon mirror is configured to scan a vertical FOV of about or greater than 90 degrees. In some embodiments, facets 934 and 938 may have a small tilt angle difference (e.g., within +/−2-5 degrees) such that they can enable generating LiDAR scan lines that corresponding to, for example, a higher middle part and a lower middle part of the vertical FOV. For instance, the tilt angles of facets 934 and 938 of polygon mirror 930 may be configured such that scan lines 1014 are positioned slightly below scan lines 1018. Because facets 934 and 938 have non-90 degree tilt angles, scan lines 1014 and 1018 may interleave. In some embodiments, the middle part of the vertical FOV corresponds to a region-of-interest (ROI). Therefore, by interleaving patterns 1014 and 1018 (generated by two facets), the scanning resolution of the middle part is improved for the ROI region. In some embodiments, if the title angles of two opposing facets (e.g., facets 904 and 908 of polygon mirror 900 in FIG. 9A) have 90-degree tilt angles (e.g., the facets are parallel to the rotational axis), the scan lines obtained by the facets may thus overlap. It is understood that depending on the configuration of the polygon mirror, the vertical FOV can be scanned in any desired manner. For example, the polygon mirror facets can be configured such that one or more ROI regions can be scanned with higher scanning resolutions. The polygon mirror can also be configured to have any number of facets (e.g., four, five, six, etc.) with same or different facet angles. Correspondingly, the scanning pattern can be distributed in any desired manner.

Figure 11B:
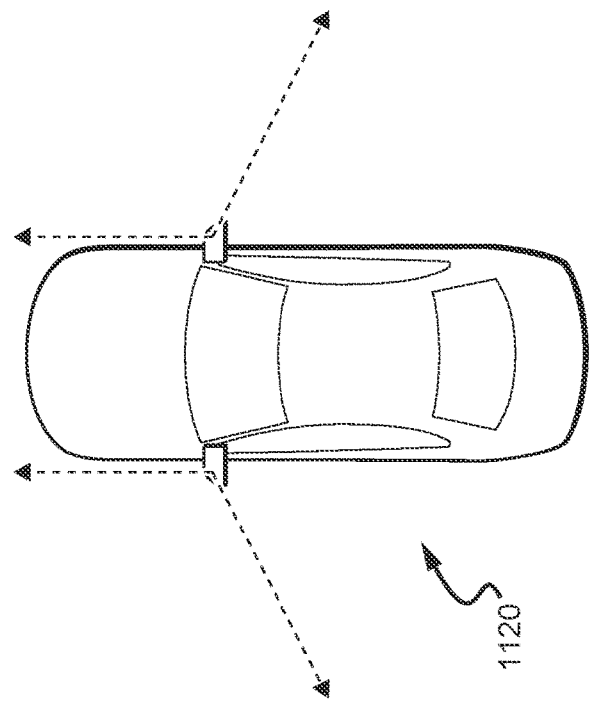
FIG. 11B illustrates a top view of a vehicle and the horizontal FOVs at the two sides of the vehicle, according to some embodiments.
Figure 11D:
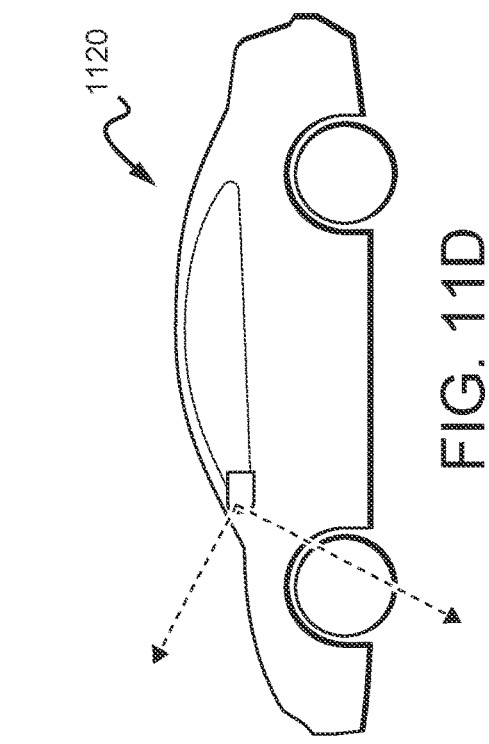
FIG. 11D illustrates a side view of a vehicle and the vertical FOV at a side of the vehicle, according to some embodiments.
Figure 11A:
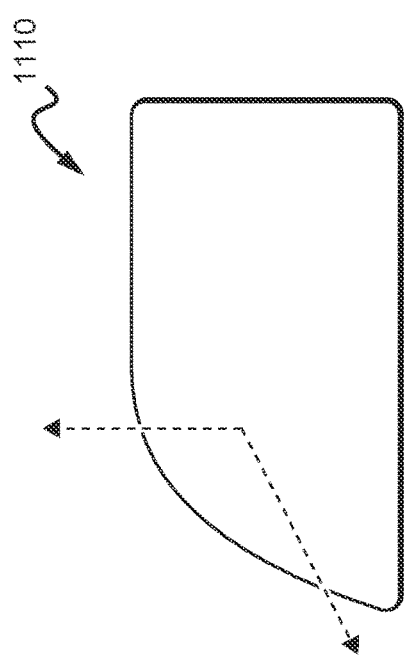
FIG. 11A illustrates a top view of a rear-view mirror assembly and a horizontal field-of-view (FOV) obtainable by a compact LiDAR device enclosed in the rear-view mirror assembly, according to some embodiments.
Figure 11C:
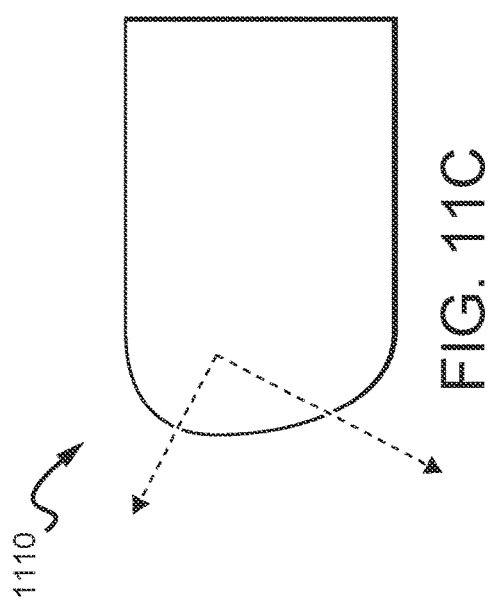
FIG. 11C illustrates a side view of a rear-view mirror assembly and a vertical FOV obtainable by a compact LiDAR device enclosed in the rear-view mirror assembly, according to some embodiments.

FIG. 11A illustrates a top view of a rear-view mirror assembly 1110 and a horizontal field-of-view obtainable by a LiDAR device mounted in the rear-view mirror assembly 1110, according to some embodiments. FIG. 11B illustrates a top view of a vehicle 1120 and the horizontal FOVs at the two sides of the vehicle 1120, according to some embodiments. FIG. 11C illustrates a side view of a rear-view mirror assembly 1110 and a vertical field-of-view obtainable by a LiDAR device mounted in the rear-view mirror assembly, according to some embodiments. FIG. 11D illustrates a side view of a vehicle 1120 and the vertical FOVs at a side of the vehicle 1120, according to some embodiments. FIGS. 11A-11D illustrate that multiple LiDAR devices described above (e.g., LiDAR device 700 and 830) can be mounted in different locations of a vehicle.

As shown in FIGS. 11A-D, a vehicle 1120 can have multiple compact LiDAR devices (not shown). The multiple LiDAR devices can be mounted to at least two of a left side, a front side, a front side, and a back side of vehicle 1120. For example, at least one of the multiple LiDAR devices is mounted at the left side of the vehicle, and at least one of the plurality of LiDAR devices is mounted at the right side of the vehicle. FIG. 11B illustrates this embodiment where the LiDAR devices are mounted in the left and right rear-view mirror assemblies of the vehicle 1120. In some embodiments, at least one of the multiple LiDAR devices is mounted at the front side of the vehicle, and at least one of the plurality of LiDAR devices is mounted at the back side of the vehicle. For instance, the LiDAR devices can be mounted at, integrated with, or enclosed in the front bumper, the front engine cover, the backside bumper, front and back corners, headlight housings, rear light housings, etc. of the vehicle 1120. Each of the multiple LiDAR devices may comprise a mirror (e.g., an un-moveable mirror or a galvanometer mirror) and a polygon mirror. The polygon mirror may have multiple facets configured as described above.

As shown in FIGS. 11A-11D, by mounting multiple compact LiDAR devices in different locations of the vehicle, an ultra-wide FOV can be achieved. For example, on each side of the vehicle (e.g., left side and right side), a horizontal FOV of about 120 degrees (or greater) and a vertical FOV of about 90 degrees (or greater) can be achieved. Thus, if two LiDAR devices are used as shown in FIG. 11B, the horizontal FOV can be about 240 degrees (or greater). Furthermore, by mounting multiple compact LiDAR devices at different locations, the number of blind spots of the vehicle can be significantly reduced or eliminated. In some embodiment, when multiple compact LiDAR devices are mounted on a vehicle, each of them is independently operable from other LiDAR devices. For example, depending on the requirements (e.g., from the vehicle), the LiDAR devices mounted at different locations of the vehicle may be turned on, turned off, instructed to scan an ROI area, instructed to reduce the scan resolution, etc. Independently controlling the LiDAR devices can facilitate reducing energy consumption and improve energy efficiency.

FIG. 12 is a flowchart illustrating a method 1200 for scanning a field-of-view using a light detection and ranging (LiDAR) device. The LiDAR device comprises a polygon mirror having a plurality of reflective facets. Method 1200 can begin with any of the steps 1202, 1206, and 1210. In step 1202, a first reflective facet of the plurality of reflective facets of the polygon mirror steers light to scan a first part of the field-of-view in a vertical direction. The first reflective facet is associated with an acute tilt angle. The first reflective facet can be, for example, facet 902 of polygon mirror 900 or facet 932 of polygon mirror 930 (FIGS. 9A and 9B). Step 1204 generates scan lines (e.g., scan lines 1012 in FIG. 10) corresponding to the first part of the field-of-view in the vertical direction. The first part of the FOV may be an upper part of the FOV in the vertical direction.

In step 1206, a second reflective facet of the plurality of reflective facets of the polygon mirror steers light to scan a second part of the field-of-view in a vertical direction. The second reflective facet is associated with an obtuse tilt angle. The second reflective facet can be, for example, facet 906 of polygon mirror 900 or facet 936 of polygon mirror 930 (FIGS. 9A and 9B). Step 1208 generates scan lines (e.g., scan lines 1016 in FIG. 10) corresponding to the second part of the field-of-view in the vertical direction. The second part of the FOV may be a lower part of the FOV in the vertical direction. In some embodiments, the first part of the field-of-view and the second part of the field-of-view are at the two ends of the vertical field-of-view.

In step 1210, one or more additional reflective facets of the polygon mirror steer light to scan one or more additional parts of the field-of-view in the vertical direction. The one or more additional facets can be, for example, facets 904 and 908 of polygon mirror 900; or facets 934 and 938 of polygon mirror 930. Step 1212 generates scan lines (e.g., scan lines 1014 and 1018) in FIG. 10) corresponding to the one or more additional parts of the FOV in the vertical direction.

In some embodiments, step 1210 can include two parts. In the first part of step 1210, a third reflective facet of the plurality of reflective facets of the polygon mirror steers light to scan a third part of the field-of-view in a vertical direction. In the second part of step 1210, a fourth reflective facet of the plurality of reflective facets of the polygon mirror steers light to also scan the third part of the field-of-view in a vertical direction. Thus, the scan lines obtained by the third and fourth reflective facets may overlap.

In some embodiments, in the second part of step 1210, the fourth reflective facet of the plurality of reflective facets of the polygon mirror steers light to scan a fourth part of the field-of-view in a vertical direction. The fourth part of the FOV is a different part from the third part. As a result, the scan lines corresponding to the third and fourth parts of the field-of-view are interleaved.

In some embodiments, step 1212 comprises generating scan lines (e.g., scan lines 1014 and 1018 shown in FIG. 10) corresponding a middle part of the field-of-view in the vertical direction. It is understood that steps of method 1200 can be arranged in any order, removed, added, omitted, and/or repeated in any desired manner.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A light detection and ranging (LiDAR) scanning device, comprising:
    a first mirror disposed to receive one or more light beams, wherein the first mirror is a galvanometer mirror controllable to oscillate about an axis of the first mirror;
    a polygon mirror optically coupled to the first mirror to receive the one or more light beams, wherein the polygon mirror comprises a plurality of reflective facets, wherein at least one of the plurality of reflective facets is associated with a tilt angle that is different from tilt angles of other reflective facets, the tilt angles of reflective facets being respective angles between normal directions of respective reflective facets and an axis about which the polygon mirror is rotatable, and wherein a difference of the tilt angles has an absolute value of at least 10 degrees,
    wherein for at least two of the plurality of reflective facets, each reflective facet is arranged such that:
        a first edge, a second edge, and a third edge of the reflective facet correspond to a first line, a second line, and a third line,
        the first line and the second line intersect to form a first internal angle of a plane comprising the reflective facet, the first internal angle being an acute angle,
        the first line and the third line intersect to form a second internal angle of the plane comprising the reflective facet, the second internal angle being an obtuse angle;
    wherein the combination of the first mirror and the polygon mirror, when at least the polygon mirror is rotating, is configured to:
        steer the one or more light beams both vertically and horizontally to illuminate an object within a field-of-view,
        obtain return light formed based on the steered one or more light beams illuminating the object within the field-of-view, wherein the plurality of reflective facets comprises a first reflective facet associated with an acute tilt angle and a second reflective facet associated with an obtuse tilt angle, wherein the first reflective facet facilitates generating of LiDAR scan lines corresponding to a first part of a vertical field-of-view; and wherein the second reflective facet facilitates generating of LiDAR scan lines corresponding to a second part of a vertical field-of-view; the first part of the vertical field-of-view and the second part of the vertical field-of-view being at two ends of the vertical field-of-view, and
        redirect the return light to an optical receiver disposed in the LiDAR scanning device.

2. The device of claim 1, wherein the polygon mirror comprises four, five, or six reflective facets.

3. The device of claim 1, wherein at least two reflective facets of the polygon mirror are parallelogram-shaped facets.

4. The device of claim 1, wherein all reflective facets of the polygon mirror are parallelogram-shaped facets.

5. The device of claim 1, wherein the polygon mirror comprises a top non-reflective surface, a bottom non-reflective surface, a left reflective facet, a right reflective facet, a front reflective facet, and a back reflective facet.

6. The device of claim 5, wherein the top non-reflective surface and the bottom non-reflective surface are rectangle-shaped surfaces, and wherein the left reflective facet, the right reflective facet, the front reflective facet, and the back reflective facet are parallelogram-shaped facets.

7. The device of claim 5, wherein the front reflective facet and the back reflective facet are rectangle-shaped, and wherein the left reflective facet and the right reflective facet are parallelogram-shaped facets, and the top non-reflective surface and the bottom non-reflective surface are parallelogram-shaped surfaces.

8. The device of claim 5, wherein the left reflective facet and the right reflective facet are rectangle-shaped facets, and wherein the front reflective facet, the back reflective facet, the top non-reflective surface, and the bottom non-reflective surface are parallelogram-shaped facets.

9. The device of claim 1, wherein each of the reflective facets is associated with a tilt angle that is different from tilt angles of the other reflective facets.

10. The device of claim 1, wherein: two opposite reflective facets are associated with a first tilt angle; two other opposite reflective facets are associated with a second tilt angle, the first tilt angle being different from the second tilt angle.

11. The device of claim 1, wherein two opposite reflective facets are associated with different tilt angles.

12. The device of claim 1, wherein the field-of-view comprises a horizontal field-of-view of about or greater than 120 degrees and a vertical field-of-view of about or greater than 90 degrees.

13. The device of claim 1, wherein the combination of the polygon mirror and the first mirror are enclosed in at least one of a rear-view mirror assembly or a light housing of a vehicle.

14. A light detection and ranging (LiDAR) scanning system, comprising:
    a plurality of LiDAR devices mountable to at least two of a left side, a right side, a front side, and a back side of a vehicle, wherein each of the plurality of LiDAR devices comprises:
    a first mirror disposed to receive one or more light beams, wherein the first mirror is a galvanometer mirror controllable to oscillate about an axis of the first mirror; and
    a polygon mirror optically coupled to the first mirror to receive the one or more light beams, wherein the polygon mirror comprises a plurality of reflective facets, wherein at least one of the plurality of reflective facets is associated with a tilt angle that is different from tilt angles of other reflective facets, the tilt angles of reflective facets being respective angles between normal directions of respective reflective facets and an axis about which the polygon mirror is rotatable, and wherein a difference of the tilt angles has an absolute value of at least 10 degrees, and wherein the plurality of reflective facets comprises a first reflective facet associated with an acute tilt angle and a second reflective facet associated with an obtuse tilt angle, wherein the first reflective facet facilitates generating of LiDAR scan lines corresponding to a first part of a vertical field-of-view; and wherein the second reflective facet facilitates generating of LiDAR scan lines corresponding to a second part of a vertical field-of-view; the first part of the vertical field-of-view and the second part of the vertical field-of-view being at two ends of the vertical field-of-view, wherein for at least two of the plurality of reflective facets, each reflective facet is arranged such that:
  a first edge, a second edge, and a third edge of the reflective facet corresponding to a first line, a second line, and a third line;
  the first line and the second line intersect to form a first internal angle of a plane comprising the reflective facet, the first internal angle of the reflective facet being an acute angle; and
  the first line and the third line intersect to form a second internal angle of a plane comprising the reflective facet, the second internal angle of the respective plane being an obtuse angle.

15. The system of claim 14, wherein at least one of the plurality of LiDAR devices is mounted at the left side of the vehicle, and wherein at least one of the plurality of LiDAR devices is mounted at the right side of the vehicle.

16. The system of claim 14, wherein at least one of the plurality of LiDAR devices is mounted at the front side of the vehicle, and wherein at least one of the plurality of LiDAR devices is mounted at the back side of the vehicle.

17. The system of claim 14, wherein at least one of the plurality of LiDAR devices is enclosed in at least one of a rear-view mirror assembly or a light housing of the vehicle.

18. The system of claim 14, wherein the plurality of LiDAR devices comprises:
  a first LiDAR device enclosed in a first rear-view mirror assembly of the vehicle, and
  a second LiDAR device enclosed in a second rear-view mirror assembly of the vehicle.

19. A vehicle comprising a light detection and ranging (LiDAR) scanning system, the system comprising:
  a plurality of LiDAR devices mountable to at least two of a left side, a front side, a front side, and a back side of a vehicle, wherein each of the plurality of LiDAR devices comprises:
  a first mirror disposed to receive one or more light beams, wherein the first mirror is a galvanometer mirror controllable to oscillate about an axis of the first mirror; and
  a polygon mirror optically coupled to the first mirror to receive the one or more light beams, wherein the polygon mirror comprises a plurality of reflective facets, wherein at least one of the plurality of reflective facets is associated with a tilt angle that is different from tilt angles of other reflective facets, the tilt angles of reflective facets being respective angles between normal directions of respective reflective facets and an axis about which the polygon mirror is rotatable, and wherein a difference of the tilt angles has an absolute value of at least 10 degrees, and wherein the plurality of reflective facets comprises a first reflective facet associated with an acute tilt angle and a second reflective facet associated with an obtuse tilt angle, and wherein the first reflective facet facilitates generating of LiDAR scan lines corresponding to a first part of a vertical field-of-view; and wherein the second reflective facet facilitates generating of LiDAR scan lines corresponding to a second part of a vertical field-of-view; the first part of the vertical field-of-view and the second part of the vertical field-of-view being at two ends of the vertical field-of-view, wherein for at least two of the plurality of reflective facets, each reflective facet is arranged such that:
  a first edge, a second edge, and a third edge of the reflective facet corresponding to a first line, a second line, and a third line;
  the first line and the second line intersect to form a first internal angle of a plane comprising the reflective facet, the first internal angle of the reflective facet being an acute angle; and
  the first line and the third line intersect to form a second internal angle of a plane comprising the reflective facet, the second internal angle of the respective plane being an obtuse angle.

20. A method for scanning a field-of-view using a light detection and ranging (LiDAR) device, the LiDAR device comprises a polygon mirror having a plurality of reflective facets, the method comprising:
  receiving light from a galvanometer mirror controllable to oscillate about an axis of the galvanometer mirror;
  steering, by a first reflective facet of the plurality of reflective facets of the polygon mirror, the light to scan a first part of the field-of-view in a vertical direction, wherein the first reflective facet is associated with an acute tilt angle;
  steering, by a second reflective facet of the plurality of reflective facets of the polygon mirror, light to scan a second part of the field-of-view in the vertical direction, wherein the second reflective facet is associated with an obtuse tilt angle, wherein a difference between the acute tilt angle and the obtuse tilt angle has an absolute value of at least 10 degrees,
  wherein each of the first reflective facet and the second reflective facet is arranged such that:
    a first edge, a second edge, and a third edge of the reflective facet correspond to a first line, a second line, and a third line,
    the first line and the second line intersect to form a first internal angle of a plane comprising the reflective facet, the first internal angle being an acute angle,
  the first line and the third line intersect to form a second internal angle of the plane comprising the reflective facet, the second internal angle being an obtuse angle;
  generating scan lines corresponding to the first part of the field-of-view in the vertical direction; and
  generating scan lines corresponding to the second part of the field-of-view in the vertical direction.

21. The method of claim 20, wherein the first part of the field-of-view and the second part of the field-of-view are at two ends of the field-of-view in the vertical direction.

22. The method of claim 20, further comprising:
  steering, by one or more additional reflective facets of the polygon mirror, light to scan one or more additional parts of the field-of-view in the vertical direction; and
  generating scan lines corresponding to the one or more additional parts of the field-of-view in the vertical direction.

23. The method of claim 20, wherein steering light to scan one or more additional parts of the field-of-view in the vertical direction comprises:
  steering, by a third reflective facet of the plurality of reflective facets of the polygon mirror, light to scan a third part of the field-of-view in a vertical direction;

steering, by a fourth reflective facet of the plurality of reflective facets of the polygon mirror, the third part of the field-of-view in a vertical direction.

24. The method of claim 20, wherein steering light to scan one or more additional parts of the field-of-view in the vertical direction comprises:
  steering, by a third reflective facet of the plurality of reflective facets of the polygon mirror, light to scan a third part of the field-of-view in a vertical direction;
  steering, by a fourth reflective facet of the plurality of reflective facets of the polygon mirror, a fourth part of the field-of-view in a vertical direction, wherein scan lines corresponding to the third and fourth parts of the field-of-view are interleaved.

25. The method of claim 20, wherein generating scan lines corresponding to one or more additional parts of the field-of-view in the vertical direction comprises generating scan lines corresponding a middle part of the field-of-view in the vertical direction.

* * * * *